(12) United States Patent
Higgins et al.

(10) Patent No.: US 10,764,292 B2
(45) Date of Patent: Sep. 1, 2020

(54) SYSTEM AND METHOD FOR MANAGING ELECTRONIC INTERACTIONS BASED ON DEFINED RELATIONSHIPS

(71) Applicant: AT&T Intellectual Property I, L.P., Atlanta, GA (US)

(72) Inventors: Robert M. Higgins, Manasquan, NJ (US); Julio Cartaya, Tinton Falls, NJ (US); Steven A. Siegel, Mendham, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/237,966

(22) Filed: Jan. 2, 2019

(65) Prior Publication Data
US 2019/0141043 A1    May 9, 2019

Related U.S. Application Data

(63) Continuation of application No. 14/645,454, filed on Mar. 12, 2015, now Pat. No. 10,187,388.

(51) Int. Cl.
| | |
|---|---|
| *H04L 29/00* | (2006.01) |
| *H04L 29/06* | (2006.01) |
| *H04W 12/08* | (2009.01) |
| *H04L 12/24* | (2006.01) |
| *H04W 12/06* | (2009.01) |

(52) U.S. Cl.
CPC .......... *H04L 63/10* (2013.01); *H04L 41/0893* (2013.01); *H04W 12/08* (2013.01); *H04W 12/06* (2013.01)

(58) Field of Classification Search
CPC ..... H04L 63/08; H04L 63/0815; H04L 63/10; H04L 41/0816; H04L 41/0893; H04W 12/08; H04W 12/06
See application file for complete search history.

(56) References Cited

U.S. PATENT DOCUMENTS

| | | |
|---|---|---|
| 8,073,810 B2 | 12/2011 | Maes |
| 8,132,239 B2 | 3/2012 | Wahl |
| 8,271,894 B1 * | 9/2012 | Mayers ............... G06Q 50/01 |
| | | 705/319 |
| 8,495,718 B2 | 7/2013 | Han et al. |
| 8,584,195 B2 | 11/2013 | Sherlock et al. |
| 8,769,622 B2 | 7/2014 | Chang et al. |
| 8,875,224 B2 | 10/2014 | Gross et al. |
| 2009/0313074 A1 | 12/2009 | Harpur et al. |
| 2010/0319068 A1 | 12/2010 | Abbadessa et al. |

(Continued)

*Primary Examiner* — Jeffrey C Pwu
*Assistant Examiner* — Helai Salehi
(74) *Attorney, Agent, or Firm* — Guntin & Gust, PLC; Jay H. Anderson

(57) ABSTRACT

Aspects of the subject disclosure may include, for example, a process that includes receiving first input defining a relationship between first and second entities, generating a first rule based on the first input, wherein the first rule determines accessibility of a networked service, and associating the first rule with the relationship. The first rule modifies settings of a service management infrastructure to effectuate the first rule in accordance with the relationship, wherein the service management infrastructure provides access to the networked service based on the accessibility. Other embodiments are disclosed.

20 Claims, 12 Drawing Sheets

(56) References Cited

U.S. PATENT DOCUMENTS

| | | |
|---|---|---|
| 2012/0198513 A1 | 8/2012 | Maida-Smith et al. |
| 2013/0086639 A1 | 4/2013 | Sondhi et al. |
| 2013/0262857 A1 | 10/2013 | Neuman et al. |
| 2014/0136589 A1* | 5/2014 | Wahler ............... H04L 63/0263 709/201 |
| 2014/0215618 A1 | 7/2014 | Striem et al. |
| 2016/0191654 A1 | 6/2016 | Healey |
| 2016/0269237 A1 | 9/2016 | Higgins et al. |

* cited by examiner

100

300

500

US 10,764,292 B2

SYSTEM AND METHOD FOR MANAGING ELECTRONIC INTERACTIONS BASED ON DEFINED RELATIONSHIPS

CROSS REFERENCE TO RELATED APPLICATIONS

This application is a continuation of U.S. patent application Ser. No. 14/645,454 filed on Mar. 12, 2015. All sections of the aforementioned application(s) and patent(s) are incorporated herein by reference in their entirety.

FIELD OF THE DISCLOSURE

The subject disclosure relates to a system and method for managing electronic interactions based on defined relationships.

BACKGROUND

Communications services support exchanges of information among various entities and according to various modes, such as voice, video, text messages, and more generally through access to data, software applications, and even computing resources themselves. Likewise, cloud services provide entities with access to various resources that can also support the processing and exchange of information. Those in the business of providing such services are in a privileged position to help manage and execute electronic or digital interactions that allow such access to resources and information exchanges.

Current approaches to managing electronic interactions can invoke network behaviors. The network behaviors include, without limitation, one or more of connectivity, data store, and software applications, and are generally very specific, e.g., responding to a particular request. In some instances, such network behavior can be common across parties engaging a common network capability. The behavior, however, is tied to a specific request, as in a routing of a voice call based on a reachability status of the call recipient. Calls from specific individuals, such as family members, may be routed to the recipient, while calls from other parties are directed to a voice mailbox, or blocked altogether. The call recipient may unilaterally identify the specific individuals to the network service provider to allow for special call routing.

BRIEF DESCRIPTION OF THE DRAWINGS

Reference will now be made to the accompanying drawings, which are not necessarily drawn to scale, and wherein.

DETAILED DESCRIPTION

Figure 1:
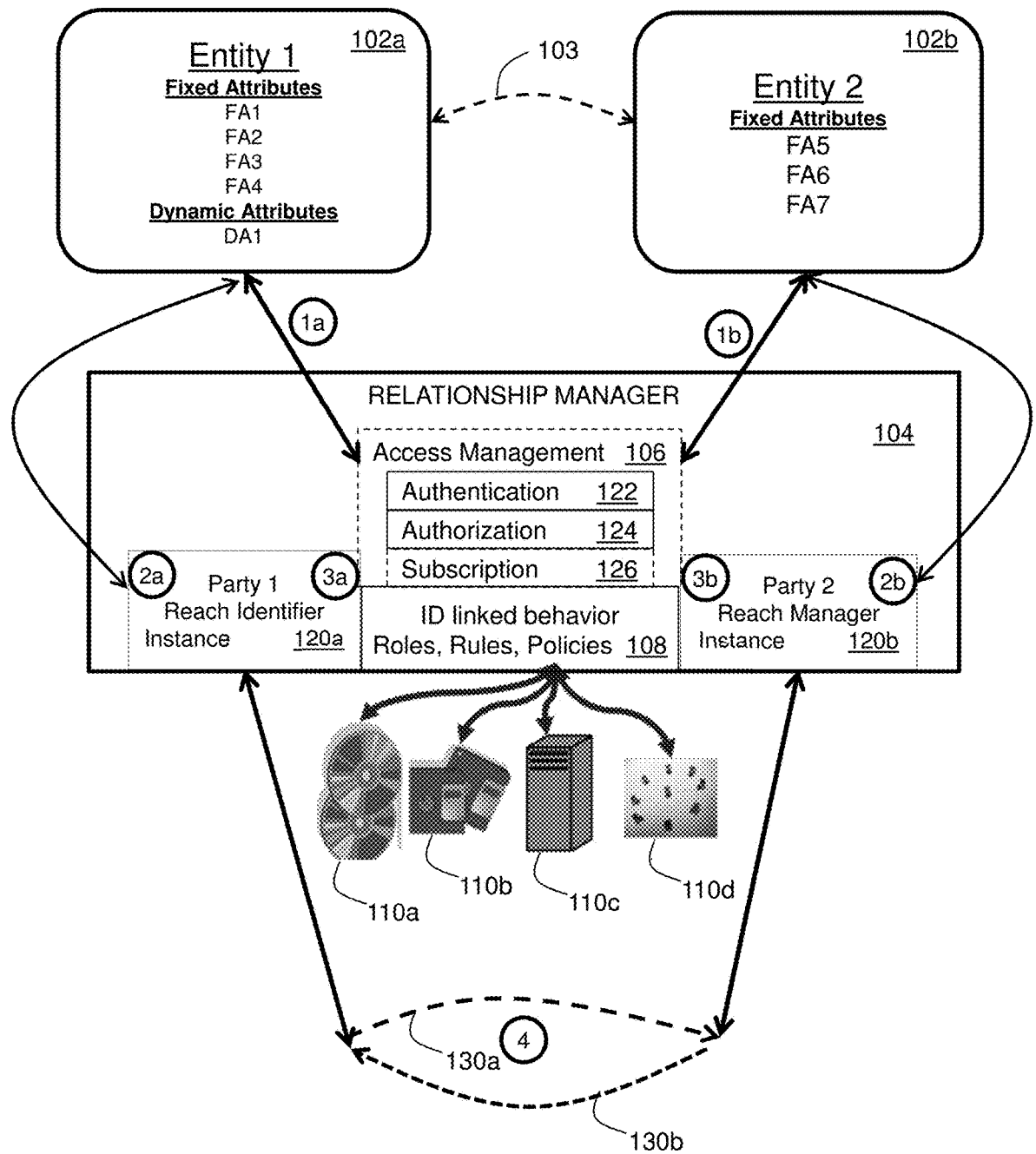
FIGS. 1-3 depict illustrative embodiments of a relationship management system.

It is recognized that various social relations exist between entities or parties that engage in such interactions. The subject disclosure describes, among other things, illustrative embodiments for managing electronic interactions, such as accessing networked services, based on a pre-defined and mutually agreed relationship between entities. For example, in a cloud based/virtual environment, a first party can define relationships with one or more second parties. The relationship can determine rules that affect or otherwise control a behavior of the interactions, such as network and cloud based application behavior.

Other embodiments are described in the subject disclosure.

One or more aspects of the subject disclosure include facilitating access to a managed service according to a predefined behavior that is based on a mutually agreed relationship between different entities. The access can be according to any of various modes, such as data access/exchanges, communications including reachability, applications, computational resources, machines, avatars, and the like. A service provider, such as a network service provider, a cloud service provider, an application service provider, a storage service provider, and the like, facilitates affects or otherwise modulates a behavior of the access to the service according to rules and/or policies of the predefined relationship. In particular, the predefined relationship is imposed upon the transaction when the involved entities have mutually agreed to a behavior (roles/rules/policies) of the relationship. This can include mutual assent to any modifications to the behavior. The relationship, indicia of the entities, related roles, rules and/or policies, including modifications can be stored in a database that is accessible by a relationship managing entity.

One embodiment of the subject disclosure includes a process that includes providing, by a system comprising a processor, information related to selectable rules to equipment of a first party and equipment of a second party, wherein the selectable rules define a relationship between the first party and the second party. A first rule is generated according to first selections received from the equipment of the first party and second selections received from the equipment of the second party. The first rule is associated with the relationship between the first party and the second party, wherein the first rule modifies settings of a network element to effectuate the first rule in accordance with the relationship between the first party and the second party, wherein the network element provides a network-accessible service, and wherein the settings modified by the first rule restrict data accessibility of the network-accessible service. The first rule is stored in association with the relationship between the first party and the second party.

Another embodiment of the subject disclosure includes a device having a memory that stores executable instructions and a processor coupled to the memory. The processor, responsive to executing the executable instructions, performs operations including receiving preferences from equipment of a first party, equipment of a second party or both, wherein the preferences define a relationship between the first party and the second party. A first rule is generated based on the preferences, and the first rule is associated with the relationship between the first party and the second party. The first rule modifies settings of a service infrastructure to effectuate the first rule in accordance with the relationship between the first party and the second party. The service infrastructure provides a network-accessible service and the settings modified by the first rule restrict data accessibility of the network-accessible service. The first rule is stored in association with the relationship between the first party and the second party.

Yet another embodiment of the subject disclosure includes a machine-readable storage medium, including a number of executable instructions that when executed by a processor, cause the processor to perform operations. The operations include receiving from equipment of a first entity, equipment of a second entity or both, first input defining a relationship between the first entity and the second entity. A first rule is generated based on the first input, wherein the first rule determines accessibility of a networked service. The first rule is associated with the relationship between the first entity and the second entity. The first rule modifies settings of a service management infrastructure to effectuate the first rule in accordance with the relationship between the first entity and the second entity and the service management infrastructure provides access to the networked service based on the accessibility.

FIG. 1 depicts an illustrative embodiment of a relationship management system 100. The system 100 includes a relationship manager 104, which can be used to control or otherwise tailor various modes of electronic and/or digital interaction of one or more entities 102a, 102b, generally 102. The modes of interaction can include, without limitation, access to network-accessible services, such as data sharing, e.g., automated information transfer, read, write, automated notifications, reach services, application access/functionality, processing resource configuration and/or availability, contract related services, and the like.

The relationship manager 104 is in communication with equipment of one or more of the entities 102, and in further communication with one or more other systems and/or services, such as storage systems 110a, application software and/or application services 110b, processing resources 110c, and network devices and/or services 110d, such as telecommunication network, a computer network, a mobile network, and more generally anything that stores, processes, and/or reacts to metadata about the actions of the entities 102, and the like. These resources or services can be referred to, generally, as information resources 110. The equipment of the entities 102 can include, without limitation, communications equipment, such as telephones, smart phones, pagers, VoIP terminals, computers, tablet processors, vehicles, machines, robots, and more generally anything with communication capabilities and/or a modifiable behavior. For example, implantable medical or recreational devices, cloud based services (private and/or public cloud), and the like.

The storage system 110a can include local storage including one or more of memories, hard disc drives, optical storage drives, flash storage devices and the like as might be within the possession of one or more of the entities 102 or a third party. Alternatively or in addition, the storage system 110 can include remotely accessible storage, such as network storage. By way of example, such remotely accessible storage can include network storage resources, e.g., storage provisioned or otherwise offered by an enterprise, such as an employer, an educational institution, and the like. Remotely accessible storage can also include cloud storage solutions, such as those provided by Apple Inc's iCloud® information management service, Google Inc.'s Google Drive, and backup storage solutions, such as Carbonite Inc.'s Carbonite® backup services and products. (iCloud® and Carbonite® are trademarks registered by the Apple Inc. and Carbonite Inc., respectively).

The applications software 110b includes one or more of software resident on equipment of one or more of the entities 102, software provided by an enterprise, such as an employer of one of the entities 102, a third party, such as a service provider, and the like. The software can be provided as executable programs resident on equipment of the entities 102, or provided by another source, such as an application server, an application service provider, etc. Applications can be owned by the entity or owned by hosting service provider. The application can be executed on the entity equipment or the hosting service provider.

The interactions can include interactions between the entities, i.e., between equipment of each of the entities, or equipment in use by or for each of the entities 102. Alternatively or in addition, the interactions can include interactions of either or both entities with various services, applications, processing resources, e.g., information resources 110, and in some instances with other entities not necessarily subject to the relationship. The interactions, regardless of the various modes and/or equipment, are based on a predetermined relationship between the entities 102. That is, interactions between equipment of the entities 102 and/or between the entities 102 and other information resources 110 are subject to roles, rules, and/or policies established by the predetermined relationship between the entities 102. For purposes of illustration, a relationship between the entities 102 is illustrated as a dashed line 103.

In more detail, the example relationship manager 104 includes a behavior module or engine 108 and an access manager 106. The relationship manager 104, e.g., by way of the behavior engine 108, is in further communication with one more of the other information resources 110. In operation, the behavior engine 108 associates one or more roles, rules, policies, as behavioral attributes to the relationship between the entities 102. The behavioral attributes can be applied to electronic or digital interactions of the entities 102 to control one or more aspects of the interactions with the information resources 110. Interactions can include identity services, relational services, computational services, communication services, data services, security and privacy services, among others.

In some embodiments, access to one or more of the information resources 110 or services can be managed according to a service management infrastructure. Managed access can include selectively allowing, blocking or otherwise modulating access to the service. In some embodiments, managed access can include provisioning new services and/or modifications to existing services. Managed access can also include configuring attributes of the service, such as authorization for access, modification, and so forth. Such infrastructures can include a controller, such as a network and/or data storage controller, a gateway server, a scheduling server, software, such as a medical records system, and the like.

The access manager 106 selectively provides or otherwise allows access to one or more features of the managed relationship. The access module 106 can provide one or more sub-modules, such as an authentication module 122, an authorization module 124, and/or a registration module 126. By way of non-limiting example, an authentication module 122 can provide any of a number of authentication techniques. That is, one or more of the entities can be authenticated by the authentication module 122. Authentication can include, separately, or in some combination, a password, a digital value, such as a token and/or a digital signature. Alternatively or in addition, authentication can be based on biometric attributes, such as a fingerprint, a retinal scan, a voice signature, a facial image, and the like. Still other authentication techniques can include equipment identifiers, e.g., SIM card of a mobile phone or a product or equipment ID number. Alternatively or in addition, authentication can leverage other factors, such as a date, time, location of the authenticating party, a telephone number and so on. Any of the various authentication techniques can be used alone or combined in a multifactor authentication. For example, a selection of which authenticating factor or combinations of factors are used for authentication can be determined dynamically, e.g., to compensate for contextual risks, such as threat levels, unusual circumstances, failure of some factors and so forth. Authentication provides some measure of assurance that the authenticated entity or persona is who he/she/it purports to be, at least to a reasonable degree of certainty.

Identity services can include, for example, creating, updating and/or removing of personas—personas include identities associated with an entity. In general, an entity relates to a real or physical entity, such as a person, an organization, a machine. An entity can also relate to an intangible entity, such as an online presence, as in an avatar, a virtual machine, an online group, and the like. Although relationships are loosely described as being between entities, it should be understood that the relationships can also exist between one or more personas of one entity with another entity and/or with personas of the other entity. Different personas allow the same entity to differentiate itself as may be beneficial in the context of relationships.

The authorization module 124 can be used to provide a separate authorization to access features of the managed relationship and/or services affected by the managed relationships. Authorization can be based on results of authentication alone or in combination with other information. Authorization, in at least some instances, can relate to a permission having been granted, e.g., by a service provider, one of the entities 102, and/or another entity or organization. Such permission may result from a subscription, e.g., to services of a network and/or cloud service provider, or to another entity, such as an application manager. Other information used in connection with authorization can include any of the authenticating factors discussed herein alone or in combination, including identities, machine or equipment IDs, times, dates, locations, occurrence of events, and so forth.

The subscription module 126 optionally provides yet another layer of access to resources and services. This may include verification that an entity or party to a relationship has subscribed or otherwise registered to a resource/service of the relationship manager 104, such as access to managed relationships, definition, modification, deletion, and so forth of one or more of relationships, entities, rules, policies and the like. The subscription module 126 can also coordinate, establish or otherwise identify other business processes and/or systems. For example, a subscription can include processes related to establishing and/or determining eligibility, accounting and/or billing. Still other processes can include extending offers, directing advertisements, etc.

The access manager 106 implementing an access management function is in communication with each of the parties 102. A timing of the communications with the access module 106 may vary depending on the action undertaken by the entities 102. For example, if the first party 102a is defining or modifying a relationship, then the first party 102a is in communication with the relationship manager 104. The second party 102b does not necessarily have to be in communication with the relationship manager 104 at the same time. However, at some point, the second party 102b may access the relationship manager 104 to review a proposed relationship, including its associated roles, rules and/or policies, and to assent to or otherwise approve the relationship and its behavior.

Figure 2:
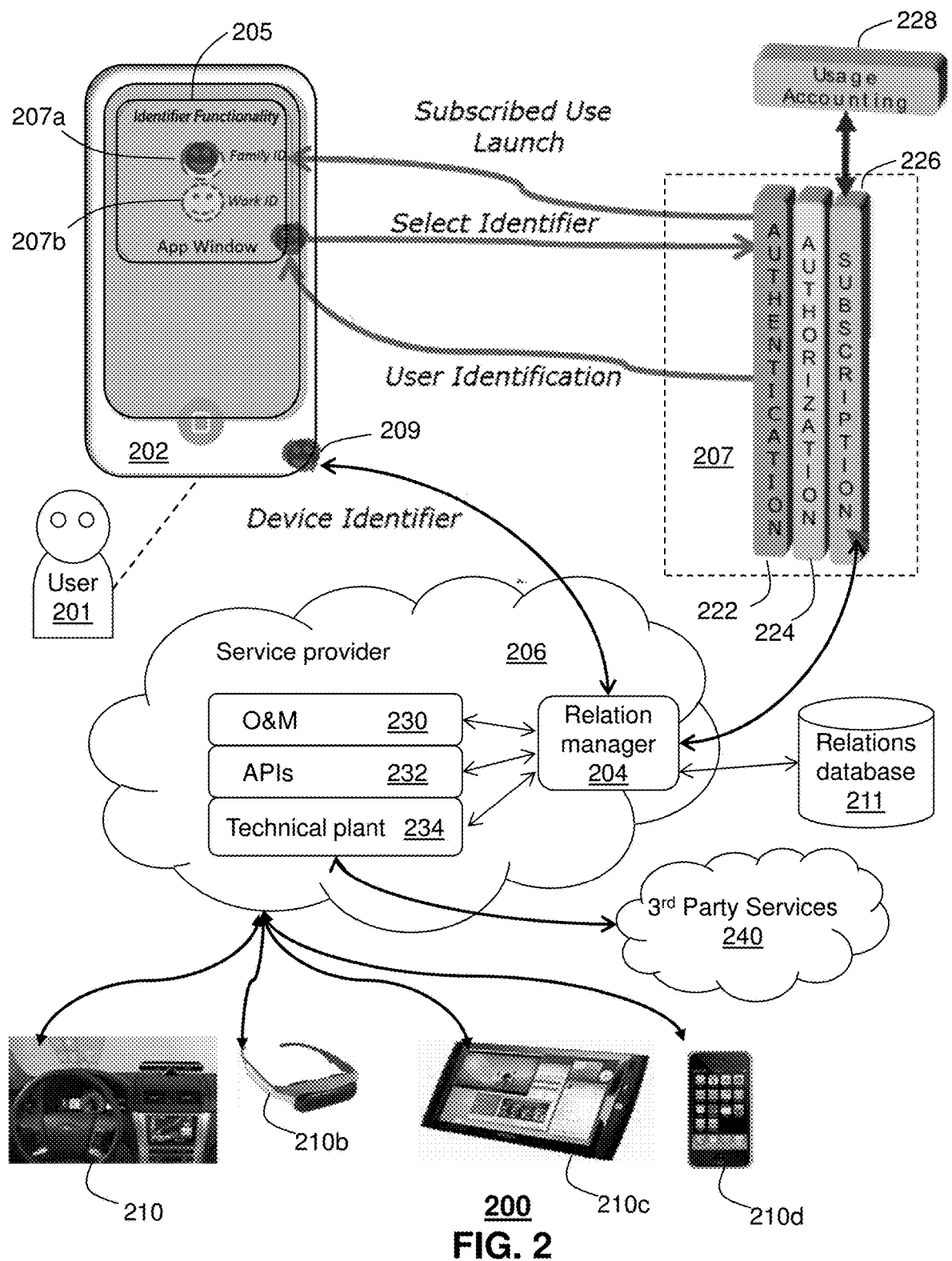

FIG. 2 depicts an illustrative embodiment of another relationship management system 200. A user device 202, e.g., a smart phone, is used to implement interactions that are linked to or otherwise associated with managed relationship behaviors. The system 200 also includes a relation manager 204, shown resident within architecture of a service provider system 206. The service provider system 206 supports user interactions with one or more information resources, such as vehicular information systems 210a, personal information systems, such as wearable information systems 210b, e.g., Google Glass, desktop and/or tablet processors 210c, smart phones 210d and the like, referred to generally as information systems 210. The information systems 210 can include equipment of the entities, such as the user device 202, resources and services of the service provider, and/or resources and services of another party or organization.

The system 200 includes an access manager 207 implementing an access management function, shown as separate from the service provider system 206. It is understood that one or more of the modules, such as the relation manager 204, the access manager 207, or the information systems 210 can be included within a common architecture of the service provider system 206, or separate from the service provider system 206. For example, one or more of the relation manager 204 or the access manager 207 can be provided and otherwise controlled or managed by an entity distinguishable from the service provider system 206. Consider the service provider acquiring access to the services of such modules on a contract basis, offering the services to their customers as part of a bundle of subscribed services.

In connection with one or more of identity and relationship management, the user equipment 202 can provider identification functionality. In the illustrative example, identity functionality 205, e.g., an application or app is launched from the smart phone 202. The identity app 205 may present a user with a selection from among a number of different identities. These can be different entities, or personas, of the same entity or individual. It is understood that the identifier functionality 205 can be tied to an authentication and/or log-in process that allow identities/personas to be managed without regard to the underlying equipment, e.g., the mobile phone 202. Here, the identifier functionality shows two different personas associated with the user. A first persona relates to a work-related persona, e.g., a work ID 207a. A second personal relates to a family-related persona, e.g., a family ID 207b. The device 202 may include a separate device identifier 209, e.g., according to a SIM module of the smart phone 202.

In operation, a user 201, after launching the identifier functionality 205, selects one of the personas, e.g., the family ID 207a. The selected family ID 207a, optionally along with other information, such as user log-in credentials, is forwarded to the access manager 206. The access manager 206 can include one or more of an authentication module 222, an authorization module 224 and a subscription module 226. Each of the modules, in turn, can authenticate, authorize the user and/or the particular persona 207a of the user. Presuming that the authorized user has subscribed to a service, the subscription module 226 can manage aspects of the subscribed services, including monitoring usage and related billing. An accounting module 228 is shown in communication with the subscription module 226 to provide such features. 202 device on . . . 209 device registers with service provider . . . user 201 invokes 205 . . . User Identification with "Authentication" 222 . . . User selects Identifier Persona 207 and 224 and 226 . . . subscribed use launch invoked to 207 and 207b Information from the access manager 206 and/or from the smart phone 202 are provided to the relation manager 204. The relation manager 204, in turn, supports establishment of new relationships with other entities, as well as management and/or modifications of existing relationships and removal or termination of relationships, as may be required. The relationship manager 204 can store or otherwise accesses stored relationship data, e.g., from a relationship database 211. The stored relationships can include one or more of indicia of the entities and/or particular personas of the relationship, a relationship type indicator, and one or more roles, rules and/or policies associated with the relationship. The roles, rules and/or policies apply to interactions of the user, e.g., by way of the user device 202. It is contemplated that the stored relationship as determined by the entities may include pointers or other suitable reference to roles, rules and/or policies that are defined elsewhere. In some embodiments, the relationship record or data structure can include other fields, such as an in-scope indicator, e.g., a particular application, data file, information resource to which the pre-defined relationship applies.

Figure 3:
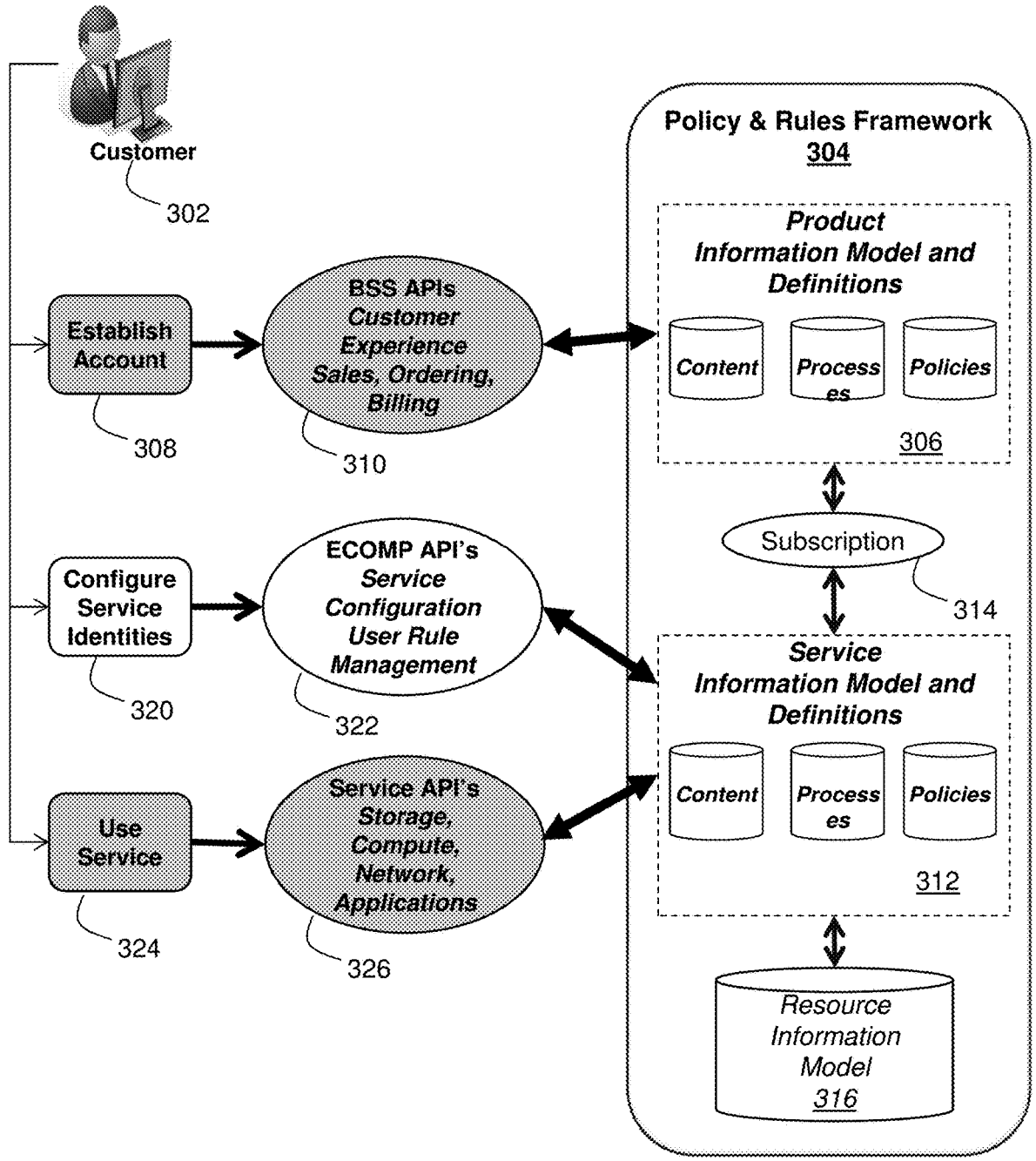

FIG. 3 depicts an illustrative embodiment of yet another relationship management system 300. The relationship management system 300 includes a policy and/or rules framework architecture 304 that supports multiple phases of establishing accounts, configuring or otherwise managing services associated with the accounts, and using or otherwise implementing the services. The framework architecture can include a product information system or module 306, a subscription system or module 314, a service information system or module 312, and a resource information system or module 316. A user, such as a customer or subscriber to a service, can access the framework architecture by way of user equipment 302. The user can interact with the framework architecture in various capacities, e.g., establishing or managing an account, related configurations and use. The policy and Rules Framework drive the behavior the user 302 experiences in each of these layers of the system architecture.

By way of illustration, a user or subscriber account can be established by an account ordering system 308. The account ordering system 308 can include or otherwise access other business support systems 310, such as business support system (BSS) application programming interfaces (APIs), customer experience, sales, ordering, and billing. The BSS APIs can be used to access or otherwise interact with the product information module 306. The product information module 306, in turn, can include one or more of content, processes, and policies as may be useful in establishing and managing user accounts.

A subscribed service can be configured by a service configuration system 320. The service configuration system 320 can include or otherwise access other service configuration support systems 322, such as related APIs, service configuration, and user rule management. The APIs can be used to access or otherwise interact with the service information module 312. Likewise, a subscribed service can be accessed or otherwise used by a user service system 324.

The user service system 324 can include or otherwise access other user service support systems 326, such as service APIs, storage, computational, network and/or applications management. The APIs can be used to access or otherwise interact with the service information module 312. The service information module 312, in turn, can include one or more of content processes and policies as may be useful in configuring and/or implementing or otherwise using managed relationships. The framework architecture 304 can also include a resource information module 316, e.g., in communication with the service information module 312. The resource information module 316 can include resources that may be required to support configuration and/or use of services.

The framework architecture 304 can include a subscription module 314 that is in communication between the product information module 306 and the service information module 312. The subscription module 314 can allow for an exchange of information, as may be required in establishing, managing, and disseminating related services under the framework architecture 304. For example, in response to a request to configure services, the service information module 312 may access information from the product information model, and modulate or otherwise provide support and/or limitations to the configured services as may result from a particular subscription. Alternatively or in addition, a request for a particular configuration or use that is not provided under a particular subscribed service may result in an exchange of information from the service information module 312 to the product information module 306. The product information module 306, in turn, may offer the user with an option to acquire the particular configuration or use under a new and/or modified subscription.

One or more of the account ordering system 308, the service configuration system 320 and the user service system 324 can be provided in the form of an application, e.g., a client-server application, in which a client portion is downloaded to or otherwise resident on the user equipment 302. Alternatively or in addition, these systems 308, 320, 324 can be provided in the form of a stand-alone device, such as a kiosk terminal or some other dedicated business terminal, or a web application in which user interactions are managed through a browser application resident on the user equipment 302. It is understood that the architecture of the illustrative relationship manager 300 can be combined or otherwise used in association with any of the other relationship management systems 100, 200, 500, 900 disclosed herein.

Referring again to FIG. 1, and with respect to predetermined rules that have been agreed to by both parties, 102, it is conceivable that behaviors according to the rules/roles/policies can be imposed or otherwise applied to interactions of either party 102, both parties, another party outside of the relationship, or any combination thereof. Accordingly, a rule between the two parties 102 can be applied to an interaction of a third party associated with the relationship 103 between the parties 102, without requiring either party 102 to be in communication with the relationship manager 104 at the time of the interaction. Namely, the relationship manager can control behavior of an interaction according to a stored record of the rule, the parties 102, and their mutual assent to the same.

In an illustrative example involving an interaction between the two parties, each party interacts with the relationship manager at 1a, 1b to establish authentication, authorization and linkage to a registered behavior by way of the behavior engine 108. A first reach identifier instance 120a is established at 2a allowing the first party to access a linked relationship behavior by way of the reach identifier instance 120a, without requiring authentication, authorization and/or linkage to the underlying equipment of the first party 102a, e.g., the first party's smart phone. Likewise, a second reach identifier instance 120b is established at 2b allowing the second party to access the liked relationship behavior. The linked relationship behavior is applied to interactions at 3a, 3b, between the first and second reach identifier instances 120a, 120b. Instead of being assigned to a particular network/telephone/communication switch line or a SIM chip, the reach manager instances can be registered from any device from which a user, i.e., the entity, can be authenticated. The linked relationship behavior can be applied to interactions between the entities 102 directly or indirectly through one or more of the linked services 110. The interactions between the parties are illustrated by the arrows at 4.

Accordingly, two or more parties, petitioning for, or allowing, some form of interface (connection, data or other programmatic interface) to gate acceptance and follow-on behavior based on a specific set of attributes, rules and policies. The system 100 allows a relationship to take place where individual, user defined attributes are provided on each end of the relationship. Namely, the relationship manager 104 controls a behavioral interface that can be used to vastly expand entity, e.g., customer, security and control. The two parties 102a, 102b each authenticate, become authorized and attach to registered behaviors by way of the relationship manager 104.

Parties 102 can expose or otherwise provide attributes for consideration in access management and/or in relationship management. The attributes can be provided explicitly by the entities, e.g., as inputs during an authentication process. Alternatively or in addition, the attributes can be identified, e.g., in a data structure, or other personal profile. Examples of attributes include, without limitation, static attributes, such as a name, a telephone number, a mobile phone number, a messaging identification/address, social security number, employee number/ID, membership number/ID, username and/or password. It is understood that attributes can also include dynamic attributes subject to change. Examples of dynamic attributes include, without limitation, a location, a business group ID, a personal group ID, hardware type and/or hardware ID, date, time, other environmental attributes. The attributes can be used alone or in combination, e.g., applying Boolean logic, to gate or otherwise modify behavior, e.g., according to the predefined relationship.

In the illustrative example, a relationship manager instance of the first entity 120a exposes three fixed attributes, e.g., FA1, FA3, FA4 of the first party 102a according to a role/rule/policy of the relationship. Likewise, a relationship manager instance of the second party 120b exposes three fixed attributes, FA5, FA6, FA7 of the second party 102b according to a role/rule/policy of the relationship. The first party 102a, through its reach identifier instance 120a and the relationship manager 104, requests connection to the second party 102b passing the appropriate attributes FA1, FA3, FA4 according to the policy/rule. The second party 102b, through its reach manager instance 120b and the relationship manager 104, receives the connection request from the first party's relationship manager instance 120a. One of the relationship manager 104, the reach manager instance of the second party 120b or both validates the attributes attached to the request, and acknowledges the request, passing identifying attributes "FA5, FA6, FA7" to the reach manager instance of the first entity 120a. One of the relationship manager 104a, the reach manager instance of the first party 120a, or both validates the returned attributes and the reach manager instances of both entities 120a, 120b invoke a registered network connection behavior.

Although interactions managed according to relationships between two entities 102 are illustrated, it is conceivable that the relationships can include more than two parties. For example, the relationship can be from one to many, as in the first party 102a, to a number of other entities, e.g., as members of a group or organization. The relationship can also be among three or more parties, requiring mutual assent of all parties to the relationship. Likewise, the first or second entity can engage in other managed relations to other parties, now shown.

Figure 4:
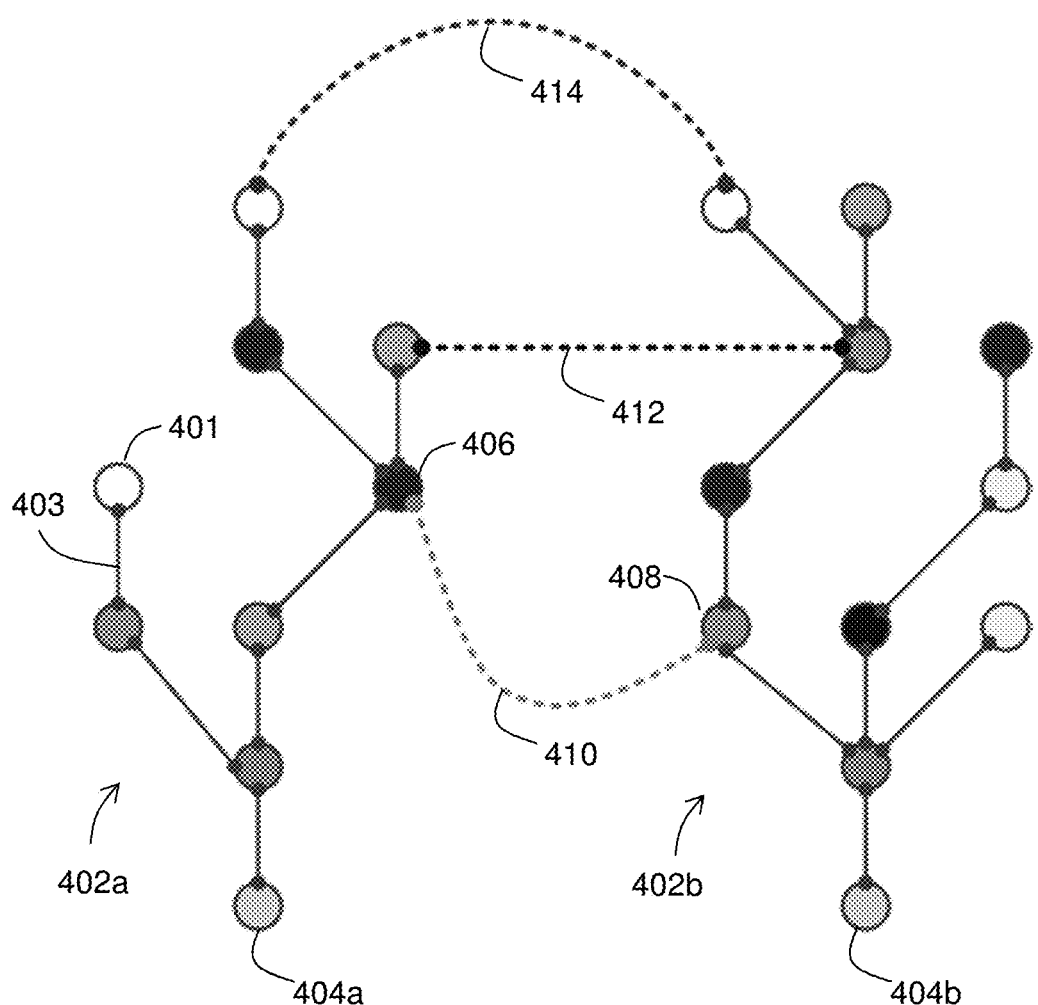
FIG. 4 depicts an illustrative embodiment of a graphical representation of entity relationships.

The relationship manager can allow or disallow behaviors among all of the "members" in a "group" in a flat (e.g., all rules apply to everyone) and/or in a tiered fashion. For example, ten members of a group join under a relationship management controlled process in an interactive audio and video conference. Each member of the group is authenticated and associated with an authorization. In some embodiments, more than one authorization can be provided to members of the group, e.g., level 1 and level 2. Consider that during the conference, material restricted to level 2 authorization needs to be presented. The conference behavior can be established by a rule(s) to disable the audio and video for level 1 participants for the duration of that discussion, returning when that part of the conference concludes. Such features can be implemented manually or automatically based on the particular relationship manager rules and attributes attached to the data being presented FIG. 4 depicts an illustrative embodiment of a graphical representation of entity relationships. A first graph represents a tree 402a having a number of nodes 401 interconnected to one or more other nodes by branches 403. The tree 402a can represent multiple identities or personas associated with a particular entity. Each node can represent a different persona of an entity, such as an individual, an organization, a group, a machine, an avatar, and the like. The tree 402a can include a root or trunk node 404a, that might represent a real identity of the entity. This might include, as indicia of the individual, one or more of a name, a number, an address, a digital value, a picture, an audio sample indicative of the entity 404a. The entity 404a can have one or more additional nodes 401 representing different identities, sometimes referred to as personas. For example, a person may have a root identity or node 404a, as in the person's name or personal identification number, such as a social security number. The same person may have other identities as in a family member, e.g., a parent, a sibling, a spouse, an employee, e.g., a co-worker, a group manager, a group member. Each of the other identity nodes, e.g., family member, employee, are related to the same root node 404a as shown by the interconnecting branches.

A second tree 402b indicative of identities of another entity is also illustrated in juxtaposition to the first tree 402a. The second tree 402b also has a root node 404b and a number of other nodes interconnected by branches. The two graphs 402a, 402b are interconnected at one or more nodes by dashed lines 410, 412, 414, sometimes referred to as edges. The edges graphically represent relationships between particular pairs of nodes of the two trees 402a, 402b. For example, a first edge 410 interconnects a first node 406 of the first tree 402a to a second node 408 of the second tree 402b. The first edge 410 represents a relationship between a first persona 406 of the first entity 404a and a second persona 408 of the second entity 408.

By way of example, according to a workplace paradigm, the first tree 402a can represent a tree of a first individual, e.g., Steve, who happens to be an employee, e.g., a junior engineer (node 406), at Corporation X. The second tree can represent a tree of a second individual, e.g., Lynda, who happens to be an engineering group manager (node 408) at Corporation X. The relationship 410 between Steve and Lynda can be characterized as an employee-manager or employee-employer type relationship. As disclosed herein, one or more rules and/or policies can be associated with the relationship 410 to affect a behavior of interactions of Steve, Lynda, or both in association to the relationship.

Continuing with the employee-employer relationship, interactions can include data access and/or exchange. For example, a rule may allow Lynda as manager to enter data into Steve's employee record. Data might include commendations, training, reviews, etc. Steve and/or Lynda may be allowed to read but not write to all fields of an electronic employee record. For example, Steve may be allowed to enter information related to training in his own employee record but not information related to commendations or reviews. Likewise, Lynda, as manager, may be able to enter information in any of the fields of Steve's employee record.

The employee-employer relationship can be established, e.g., at the time Steve is hired, promoted, and/or changes groups. In establishing or revising their relationship, Steve and Lynda would review the various rules, such as those concerning data access, and if they agreed, assent to them. A record of the relationship, the entities and/or personas, and the rules would then be stored as a record in a relationship management database. Indicia that each party agreed or otherwise assented to the particular rules of the relationship can be retained in the same record, or in a related record. Such indicia of consent can contain various details, such as the assenting party, the date, the time, indicia of authentication of the assenting party and so forth. Assent to particular rules of the relationship can be tracked independently to provide a record of when and who assented to particular aspects of the relationship, mutual assent being determined only when both parties have assented to the relationship in its entirety (this can be determined by overall assent, or by incremental assent).

It is conceivable that the employee-employer relationship can be between the employee, Steve, and the business entity, Corp. X. Similar rules can be defined and applied to electronic interactions of Steve, Corp. X, or by another party, such as Lynda as manager, according to the relationship between Steve and Corp. X. In this instance, assent between Steve and Corp. X can control a behavior, such as data access to Steve's employee records, by a third party, Lynda.

Assent can be obtained independent from each party to the relationship, with mutual assent being established or otherwise concluded when all parties have assented. In some embodiments, an assent process includes a negotiation. For example, a proposal identifying a relationship and/or rules is presented. The proposal can be presented from one party to another, to each party individually, or to all parties collectively, e.g., from an outside entity, such as a relationship broker or manager.

The parties can assent to or otherwise agree to or accept the proposal or, in some embodiments, propose a counter offer. The counter offer can be a modification or substitute in whole or in part to the proposed relationship and/or rules. In some embodiments, such proposals are monitored, e.g., by an outside entity, such as the relationship broker or manager, for consistency, compliance, completeness, etc. Any inconsistencies can be identified to allow the proposer of the counter offer to correct and/or amend the counter offer until compliant. The parties can assent to or otherwise agree to the new/modified relationship and/or rule, or engage in further modification. In some embodiments, the modifications can be bidirectional, in which each party may offer modifications until a mutually agreeable relationship and/or rule is identified.

In some embodiments, a proposed relationship and/or rule is presented with limited opportunities for modifications. For example, the proposal can be made as a "take it or leave it" proposition. Such unilateral proposals can be efficient under certain circumstances, e.g., in a doctor-patient relationship in which a doctor's practice proposes a set of rules, e.g., allowing a patient to access medical records. The doctor is generally interested in preserving integrity of and in some instances access to such records. Accordingly, the doctor may not allow the patient to write to the record, or certain fields of the record, to share the record without restriction, and so forth. Accordingly, the patient can merely choose to accept or decline an offer to establish such a relationship according to the techniques disclosed herein.

It is also worth noting that in some instances, a direction of the relationship, e.g., from employee to employer may differ from a relationship between the same two entities in a different direction, e.g., employer to employee. Continuing with the example, Lynda may have authority to view certain fields of Steve's employee record, such as his salary. To the contrary, Steve may not be granted authority to view certain fields of Lynda's employee record, such as her salary. It is understood that such bi-directionality of a relationship can be symmetrical, e.g., the same rule applies to each entity of the relationship in either direction, or asymmetrical, e.g., at least some rules differ depending upon a perspective of the parties to the interaction (Steve to Lynda, or Lynda to Steve).

As for managing such relationships, it is conceivable that a common relationship between parties can be defined according to the same set of rules applied to either party, or to different sets of rules applied to respective parties of the same relationship. Alternatively or in addition, relationships between the same parties can be distinguished as different relationships depending upon a perspective of the entities. Namely, the employee-employer relationship between Steve and Lynda can be managed, e.g., stored, as an entirely separate relationship from the employer-employee relationship between the same entities, Lynda and Steve.

It should be understood that more than one relationship can exist between the same two entities, as indicated by the multiple edges 410, 412, 414 shown in FIG. 4. Consider a scenario in which the employer and employee may members of a common advisory board, or some other social organization, such as a club or a team. Relationships between the same entities, e.g., Steve and Lynda can be managed or otherwise distinguished according to the particular identities or personas associated with the relationship. Namely, any relationships managed between Steve and Lynda as employee-employer can be managed in a linked manner, or entirely distinguishably from another relationship between Steve and Lynda as co-board members, or co-team members.

As is indicated by the connected nodes and branches of the example trees 402a, 402b, generally 402, one or more of the identities or personas, the rules or both can have a hierarchal relationship with respect to other identities, personas and/or rules. That is, a particular persona and/or rule may inherit certain attributes and/or rules or policies from another personal and/or rule, based on a hierarchal relationship between the nodes and/or edges. Consider the employee-employer relationship 410 having rules, such as the aforementioned rules governing data access/exchange. Steve and Lynda as members of a common corporate group, such as a minority employee group, may have a distinguishable second relationship as equals. Accordingly, some rules attributed to the first relationship may apply to some interactions, whereas other rules attributed to the second relationship may apply to other interactions. Some of the rules may be inherited, such as reachability under the employee-employer may apply equally to the minority group members, whereas other rules may differ.

Figure 5:
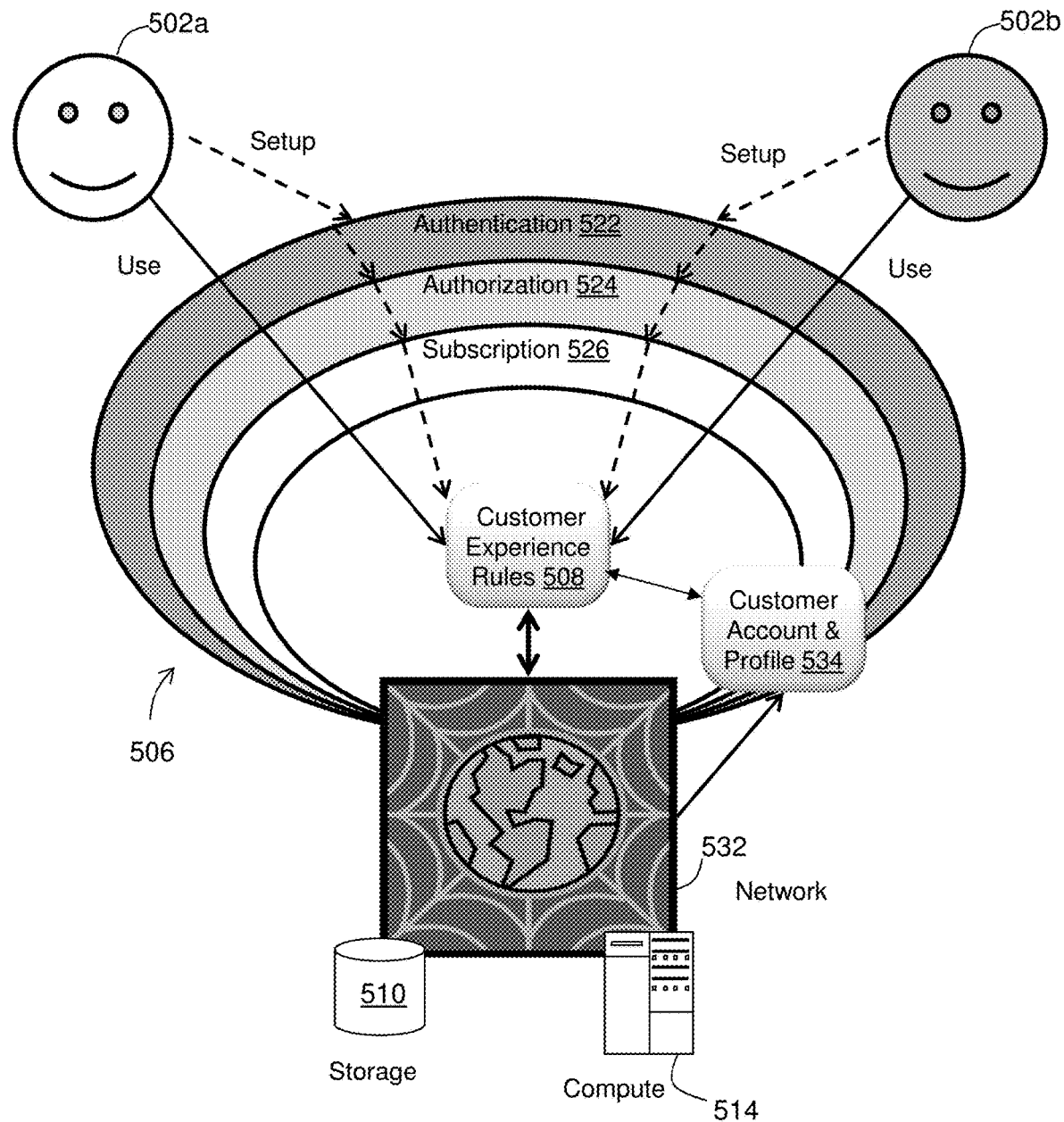
FIG. 5 depicts an illustrative embodiment of a relationship management system.

FIG. 5 depicts an illustrative embodiment of yet another relationship management system 500. The relationship management system 500 includes an access manager 506 to manage access of a first entity 502*a* and a second entity 502*b* to a service. In the illustrative example, the entities 502*a*, 502*b*, generally 502, access a customer experience rules engine 508. The customer experience rules engine 508 is connected to a network 532, such as local area network, an enterprise network, and/or a wide area network, such as the Internet. The customer experience rules engine 508 is in further communication with other resources, such as storage 510 and/or computational resources 514 by way of the network 532. The system 500 can include other modules, such as a customer account module 534. It is understood the customer account module 534 can include a profile that can be managed or otherwise configured according to the entities 502. Namely, an individual user 502 and/or a service provider can establish and otherwise maintain a customer account and/or user profile by way of the customer account module 534. The customer experience rules engine 508 can access information from the customer account module 534 as may be relevant in accessing and/or managing rules related to the customer experience.

In the context of a relationship manager, the customer experience rules can implement a relationship management feature in which relationships between entities 502 can be identified, modified and retained. Use, e.g., access to network services, cloud services, application services, computational and/or storage services and the like can be managed or otherwise gated according to the relationship. As illustrated, the customer experience rules engine 508 can manage a customer experience of the entities 502 from an edge node of the network 532. The illustrative access manager 506 provides a layered or tiered access by which each entity 502 can separately be authenticated by an authentication module 522, authorized by an authorization module 524 and access subscribed services through a subscription module 526. Usage or access to any of the managed resources and/or services can be blocked or otherwise restricted when either entity 502 fails to successfully complete the multi-tiered access. It is understood that the architecture of the illustrative relationship manager 500 can be combined or otherwise used in association with any of the other relationship management systems 100, 200, 300, 900 disclosed herein.

Figure 6A:
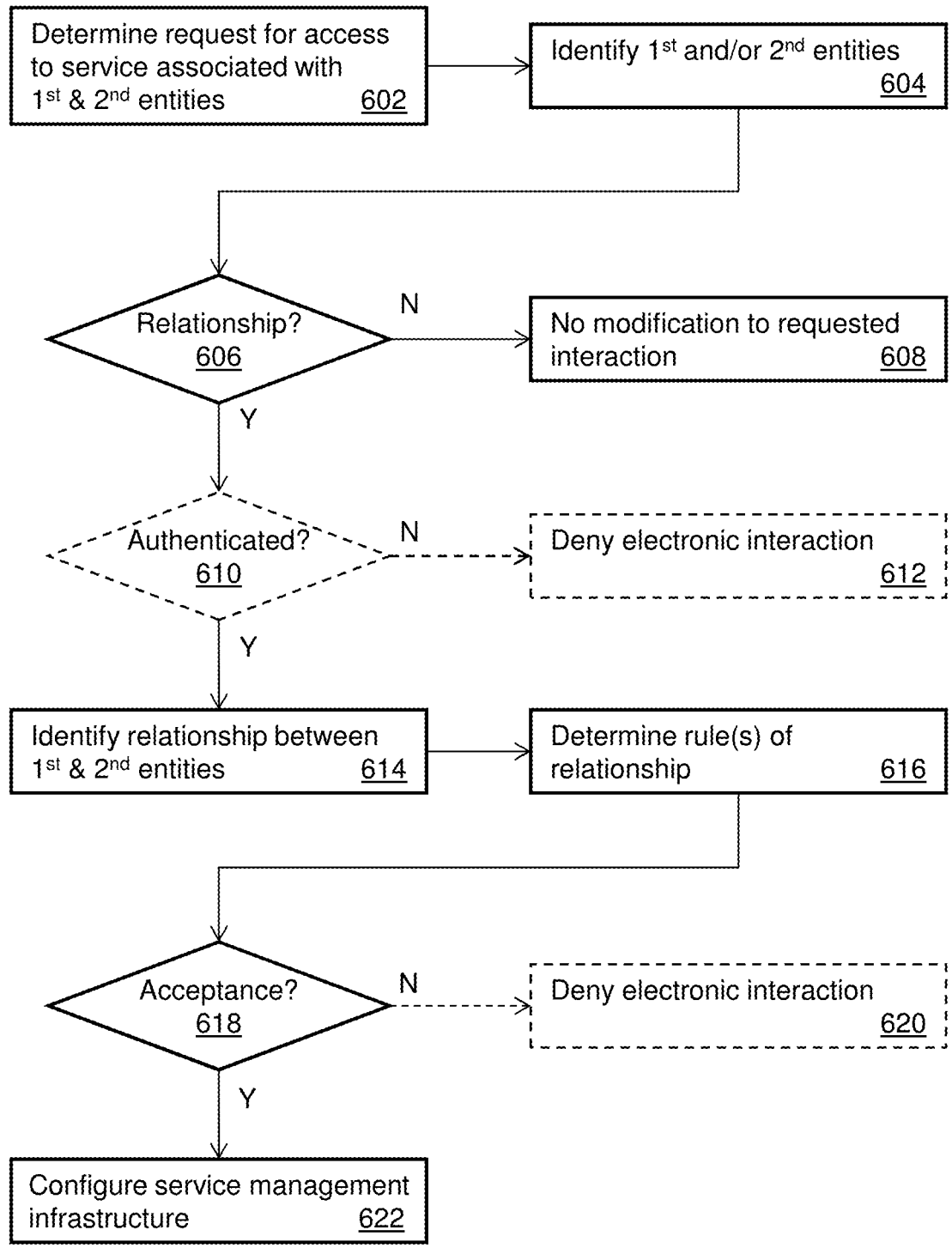
FIGS. 6A, 6B, and 7-8 depicts illustrative embodiments of methods used in portions of the system described in FIGS. 1-3 and 5.

FIG. 6A depicts an illustrative embodiment of a process 600 used by the relationship management systems of FIGS. 1-3 and 5. In particular, the process 600 relates to implementing electronic or digital interactions of one or more parties according to a predetermined relationship. The interactions can be in the form of accessing a service. The service can include access to an application, a system, such as a network, and/or a device, such as a server, machine, a virtual machine. A request for access to a service associated with two entities is determined at 602. Such a request can be determined, e.g., by a communication, such as a call or message from one party to another. Such a request can also be determined by a request to access a particular service or system. The entities are identified at 604. The entities can be identified by any suitable technique, such as a call or message source ID and/or a call or message destination ID. A determination is made at 606 whether a relationship exists between the two entities. This can be accomplished, e.g., by searching a data store of predetermined relations, e.g., according to one or more of the parties, or requested service or resource. To the extent a relationship does not exist, various processing can take place at 608, for example, denying access to the requested interaction, denying access to a modification of the requested interaction according to a behavior of a predetermined relationship, or both. Such denials can result in a message to one or more of the parties to the relationship notifying them that a request was made and that the request was denied. In some embodiments, a denial can result in an offer for the parties to engage in and/or modify a relationship according to the techniques disclosed herein.

To the extent that a relationship does exist, the relationship between the entities is identified at 614. In some embodiments, a determination is made at 610 as to whether one or both of the entities and/or the relationship itself is authenticated or otherwise authorized. In response to a lack of authentication and/or authorization, various processing can take place at 612, for example, denying access to the requested interaction, denying access to a modification of the requested interaction according to a behavior of a predetermined relationship, or both.

Once the relationship has been identified, any roles, rules and/or policies associated with the relationship are determined at 616. A determination is made at 618 as to whether the predetermined relationship, including any associated roles, rules and/or policies, has been accepted. Acceptance can be by either entity of the relationship, or by both entities. To the extent that there is mutual acceptance, a service management infrastructure can be configured at 622, whereby the requested access to the service is implemented according to a behavior imposed by the roles, rules and/or policies of the relationship. To the extent that there no indicia or record of mutual acceptance, various processing can take place at 620, for example, denying access to the requested interaction, denying access to a modification of the requested interaction according to a behavior of a predetermined relationship, or both. It is understood that an exchange of attributes between one or more of the parties can occur, e.g., in a context of a request for the interaction or in response to identification of a predetermined rule.

Figure 6B:
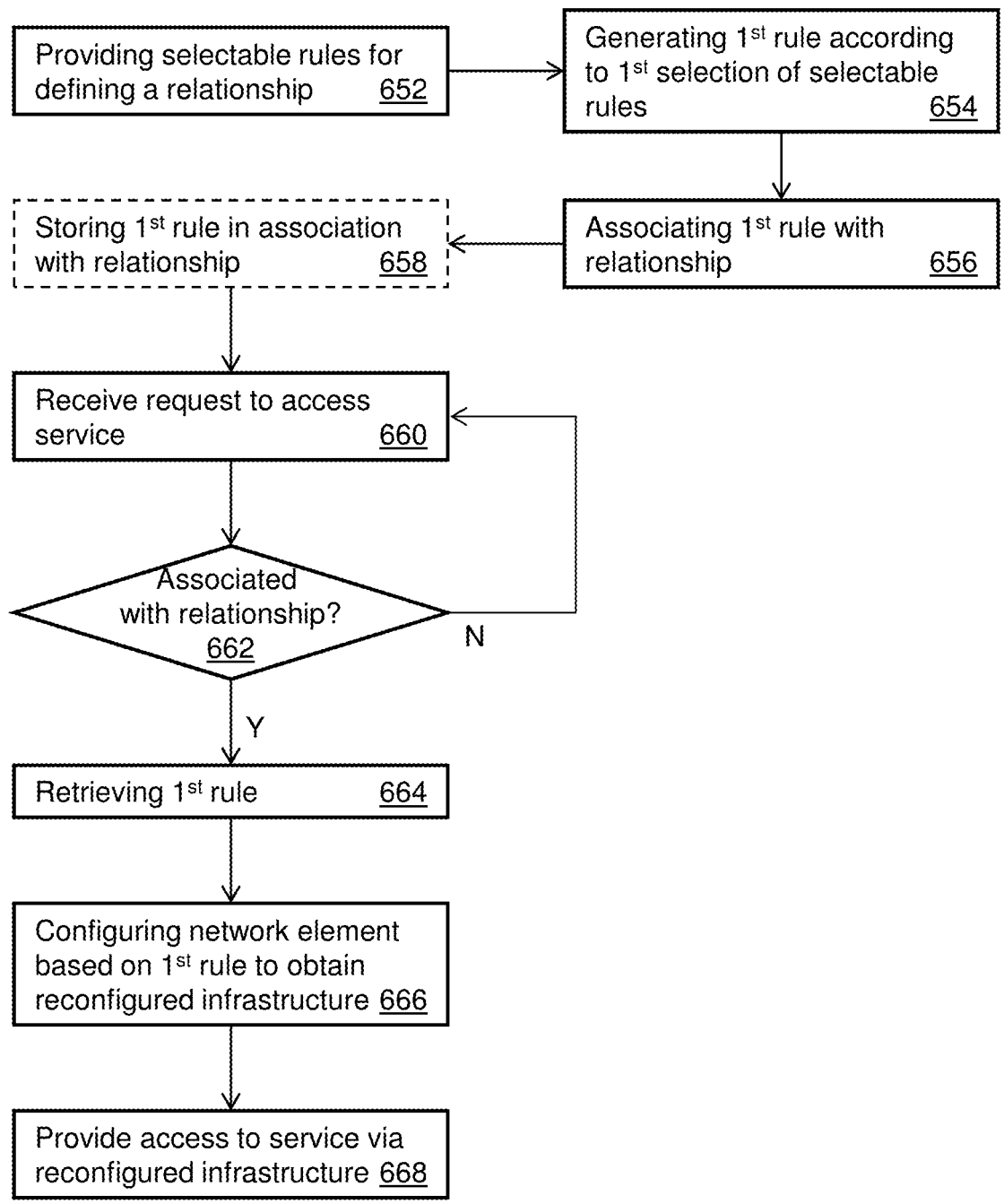

FIG. 6B depicts an illustrative embodiment of another process 650 that can be used by the relationship management systems of FIGS. 1-3 and 5. In particular, the process 650 relates to creating and/or modifying a rule associated with a relationship that can be used to configure a network element to obtain reconfigured infrastructure that provides network-accessible services according to the rule. The network element can include, without limitation, any device or system of devices, whether real and/or virtual, hardware and/or software that are connected to, part of, or otherwise accessible via a communications network. In some embodiments, one of the first entity, the second entity or both is a network service provider providing one of the service, e.g., a network-accessible service, the network element, the infrastructure equipment that supports access to the network element, or a combination thereof. Such service providers can include, without limitation, network service providers, cloud service providers, content service providers, application service providers, and so on.

One or more selectable rules are presented to equipment of a first party and a second party at 652. The selectable rules can be used to define a relationship between the parties. The selectable rules can be presented as options or preferences to each of the parties. The parties can make selections based on the presented options. The selections can be made independently or collectively, e.g., from a common or shared selection screen of a user interface. The selections can include rules that are defined in whole or in part by one or both of the parties.

It is generally understood that a social relationship may exist between the parties. The social relationship can be based on one or more of societal status, occupation, association, location, preference, and so on. The social relationships can include behaviors, traits, characteristics, expectations, norms, and so on that apply to interactions involving one or more of the parties to the relationship.

A rule is generated at 654 according to first selections received from the equipment of the first party and second selections received from the equipment of the second party. The rule, in defining the relationship, can define or otherwise characterize one or more of the behaviors, traits, characteristics, expectations, norms as they may apply to the relationship itself, and/or interactions of one or more of the parties to the relationship with network-accessible services.

The first rule is associated with the relationship between the first party and the second party at 656. In some embodiments, the rule can be stored in association with the relationship at 658. The association can be captured using any suitable data structure. In the illustrative embodiments, a database is used to store associations of the rules with the relationships between parties. For example, a database record can include identifiers for both parties, an identifier of the relationship, which can include a type identifier (e.g., according to a number of standard types of social relationships), and the first rule. The first rule can be captured in the database record as an identifier and/or pointer to particulars of the first rule, a description of the first rule, the actual rule, executable code, script, or file, etc. It is understood that the foregoing can be accomplished during a design and/or reconfiguration process or phase, e.g., during interactions with the service configuration system 320 (FIG. 3).

A request to access the network-accessible service is received at 660. The request can be received from a communication device, such as a smart phone, tablet or server of one of the parties. Alternatively or in addition, the request can be received from equipment of another party who is associated with the relationship. Other parties who can be associated with relationships can include, without limitation, proxies, e.g., a spouse or parent, delegates, associates, e.g., officers, managers and/or employees of a business entity. It is understood that such associated parties can be defined and stored in association with the relationship providing the associated parties with access to network-accessible service in accordance with rules agreed to between the first and second parties.

A determination is made at 662 as to whether the request is associated with the relationship. For example, a request can be associated with an access and/or authorization process to identify to a pre-established degree of certainty that the requestor is associated with the relationship. This process can be as simple as obtaining a user ID and/or equipment ID in association with the request. In some embodiments, the requestor can be queried, tested, and so on. It is also understood that such authentication, authorization and/or subscription can be applied as a prerequisite for providing selectable rules 652 and generating the rule at 654 and associating the rule with the relationship at 656.

To the extent that it is not associated with the relationship, the process continues to receive requests to access service 660, determining whether each subsequent request is associated with the relationship at 662. To the extent that the request is associated with the relationship, the first rule is retrieved at 664. For example, the rule can be retrieved and/or otherwise accessed by information stored with the relationship at 658.

The network element is configured at 666 based on the rule to obtain a reconfigured infrastructure. In some embodiments, the configuration is established once, e.g., in association with generation of the first rule at 654 and association of the first rule with the relationship at 656. Alternatively or in addition, the configuration can be established in association with the request for access at 660 and confirmation that the request is associated with the relationship at 662. It is conceivable that a portion of the configuration can be established during generation of the rule, and another portion of the configuration being established in response to access requests. Access to the network-accessible service is provided via the reconfigured infrastructure equipment at 668.

Figure 7:
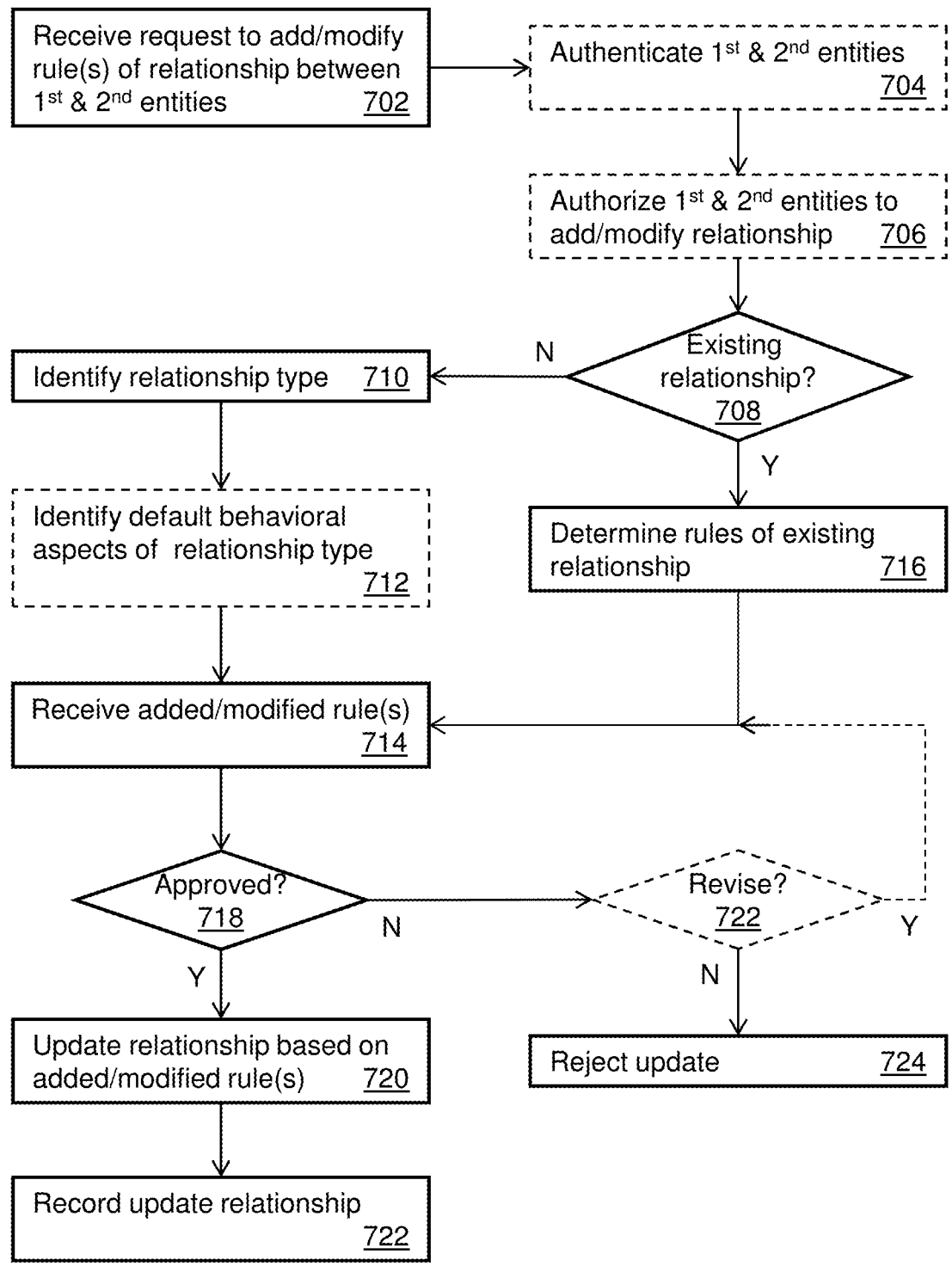

FIG. 7 depicts an illustrative embodiment of another process 700 used by the relationship management systems of FIGS. 1-3 and 5. In particular, the process 700 relates to creating and/or modifying a predetermined relationship that can be used to modify a behavior of an electronic or digital interaction of one or more parties. A request to add and/or modify a role, rule and/or policy of a relationship between two entities is received at 702. In some embodiments, separate actions are undertaken to control access to relationship features. For example, according to the illustrative embodiments, one or both of the entities can be authenticated at 704. Alternatively or in addition, one or both of the entities can be authorized at 706, ensuring that only authenticated and authorized entities can participate in creation and/or modification of relationships.

A determination is made at 708 as to whether a relationship already exists between the entities. This may occur when the entities are updating or otherwise modifying a predetermined relationship. To the extent that a relationship does exist, one or more parameters of the relationship, e.g., any roles, rules and/or policies associated with the predetermined relationship are determined at 716. For example, the existing parameters can be presented to one or both entities to support or otherwise facilitate modification of an existing predetermined relationship.

To the extent that a relationship does not already exist, a relationship type can be identified at 710. In some instances, the relationship type can be a name, tag or other suitable means for identifying the relationship. In such instances, the relationship can be named or otherwise identified according to the whims or wishes of the entities. Alternatively or in addition, the type of relationship may impart some significance to the relationship itself.

In some instances, default relationships are available, e.g., based on the identified relationship type determined at 710. To the extent there is a default relationship, the roles, rules and/or policies associated with the relationship are identified at 712. Any existing parameters related to the default relationship can be presented to one or both entities to support or otherwise facilitate modification of an existing predetermined relationship. One or both entities can add or modify existing roles, rules and/or policies at 714.

The relationship as created and/or modified is presented to both parties for review and approval. A determination is made at 718 as to whether both parties approved the new/modified relationship. To the extent that the relationship has been mutually approved, the relationship is updated at 720 based on the defaults as well as any added and/or modified roles, rules and/or policies. The updated relationship can be stored or otherwise recorded at 722.

To the extent that the relationship has not been mutually approved at 718, the entities can be presented with an option to revise the rule. This might occur under a negotiation of a relationship between the two entities. An initial relationship can be approved and proposed by one entity and submitted to the other entity for review and approval. A determination is made at 722 as to whether the relationship should be revised. To the extent that a revision is preferred, added and/or modifications to the relationship are received at 714. Processing continues from 714 as set forth above. To the extent that a revision is not preferred, the proposed relationship can be rejected at 724.

Figure 8:
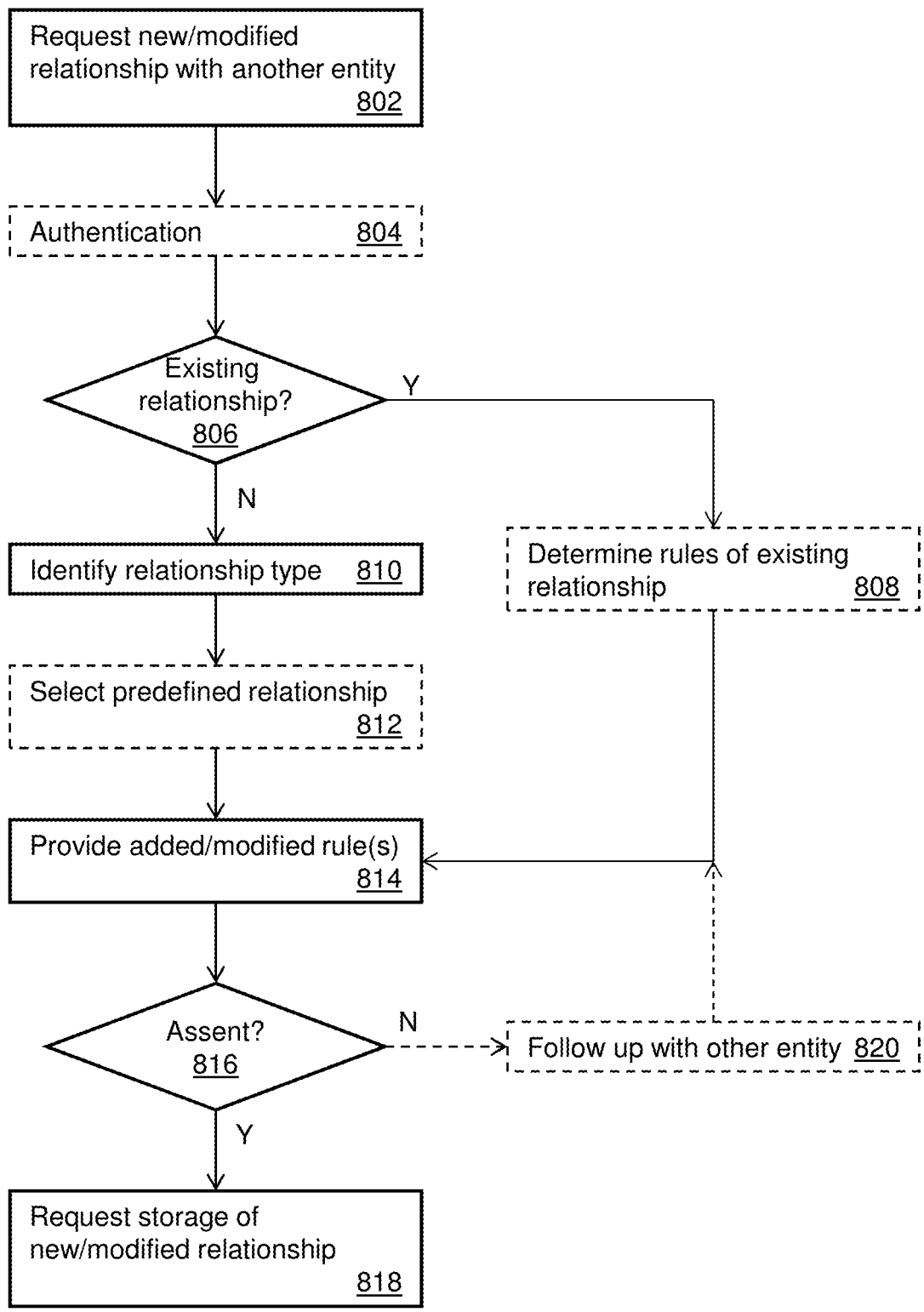

FIG. 8 depicts an illustrative embodiment of yet another process 800 used by the relationship management systems of FIGS. 1-3 and 5. In particular, the process 800 relates to requesting creation of a new relationship or modification of predetermined relationship that modifies a behavior of an electronic or digital interaction of one or more parties. A request create and/or modify a relationship with another entity is provided at 802. In some embodiments, separate actions are undertaken to control access to relationship features. For example, according to the illustrative embodiments a requesting party provides authentication at 804. In some embodiments, authorization can also be requested from the other party at 804.

A determination is made at 806 as to whether the requested relationship is an existing relationship. To the extent the requested relationship is an existing one, a determination of the roles, rules and/or policies of the relationship can be determined at 808. To the extent that the requested relationship is not an existing one, a selection can be made at 812 of a predefined relationship. Such a selection may be from a menu or listing of available relationships. In either event, additions and/or modifications of the relationship roles, rules and/or policies are provided at 814.

A determination is made at 816 as to whether both parties assented to or otherwise agreed to the new/modified relationship. To the extent that the relationship has been mutually approved, a request can be made for storing the new and/or modified relationship at 818. It is understood that in some instances, a specific request to store the relationship may not be necessary, the relationship being stored automatically, e.g., in response to mutual assent at 816. To the extent it is determined at 816 that the relationship has not been mutually assented to; the requesting entity can follow up with the other entity at 820. Such follow up can be formalized, e.g., according to a predetermined protocol, or informal, e.g., by way of a message exchange and/or voice call or meeting. Depending upon the results of such a follow up, the process may return to providing added and/or modified rules at 814, followed by a subsequent determination whether mutual assent to the modified relationship is obtained at 816.

The roles, rules and/or policies generally describe behaviors applied to electronic or digital interactions. The behaviors may be implemented by a service provider (data access, functionality of app., message/call transfer, etc.) based rules that may also rely on one or more attributes (fixed and/or dynamic). By way of example, reachability of one party by another may depend on a dynamic attribute, such as a date, time of day, a schedule, an event, and/or equipment. Consider a lawyer, Jane, who has established a predetermined relationship with an important client that allows the client to reach Jane by voice at any day or time of day, unless Jane's schedule and location both indicate that she is in court. Other rules to the same relationship may vary a mode of an interaction, e.g., providing a call alternative, again based on one or more of a date, location, and so forth.

In another example, a customer accesses services, such as media services, of a media content service provider. The customer and the service provider have established a predetermined relationship in which the customer can access content from certain approved devices, e.g., the customer's home entertainment system. According to rules of the predetermined relationship, charges and/or rates may apply based on particular Equipment IDs, locations and so forth. In this example, the customer's request for access to content provides an equipment ID attribute. This attribute is compared to a list of allowable equipment IDs. Services are provided, modified and/or blocked based on attributes including the equipment ID according to the predetermined rules.

In another example employee's request to access a business system, e.g., stored data and/or a server, or virtual machine, may be granted or otherwise restricted according to a predefined relationship between the employee and the employer and/or between the employee and the virtual machine as an entity. Consider situations in which the employee may be able to access the virtual machine based on one or more of time of day, employee location, device used by employee. Such restrictions can be used as an added measure of flexibility and security, ensuring that the employee cannot access sensitive information in unauthorized locations, such as coffee shops or restaurants.

In yet another example, access to patient records and/or a medical application related to the patient records is managed according to one or more predetermined relationships between the patient and other entities. In a first relationship, a doctor-patient relationship, the patient establishes a relationship with a primary care physician, Doc. A. Establishing the relationship may be according to a request from one of the parties, e.g., the patient, that include an identified rule. For example, the rule can allow Doc. A to read and write medical information into online medical records of the patient according to a network-accessible medical records management system. Doc. A may accept the proposed rule of the doctor-patient relationship as stated by the patient. Alternatively, Doc. A may counter with a modified and or new rule(s), seeking acceptance by the patient of the modified rules. The patent may accept, reject and/or further modify the rule(s) as desired. The process can continue until the parties reach a mutual accent or terminate the negotiations.

It is conceivable that in some relationships, one of the parties may be unwilling to negotiate, per se, rather providing a rule or set of rules for a given relationship as a "take it or leave it" proposition. Consider the doctor-patient relationship in which Doc. A may offer a specific rule or set of rules to the patient. If the patient assents, then the relationship is established. Otherwise the relationship is not established.

The relationship may allow Doc. A to read and write to various fields within the patients' medical records. In a second relationship, also doctor-patient relationship, the patient establishes a relationship with a specialist, Doc. B. The relationship may allow Doc. B to read, but not write to various fields within the patients' same medical records. The relationships, once established and mutually agree do, can be implemented during subsequent interactions with the patient's medical records, such that Doc. B can access the latest, up-to-date information about the patient, without having to make separate requests and/or obtain authorization for each instance.

In more detail, a service provider, such as a network service provider offers the medical records application as a service. The network service provider may also manage the relationships, such that pre-defined relationships between parties are stored and accessible to the network service provider. When a party makes a request through the network for an interaction with the patient's medical records, the network service provider detects the requested interaction and determines whether a relationship exists. This may be a multi-step process in which the parties are first identified, e.g., patient and Doc. A. A relationship database can store records retaining predefined relationships between the patient and Doc. A.

In some instances, the request for services is further examined to determine if the relationship is within scope. For example, if the request is to access the medical records application, and the behavior controlling access to medical records is identified by the rules of the relationship, then the request can be considered in scope and the particular behavior of the relationship applied to the request, e.g., allowing Doc. A to read from and/or write to the medical records of the patient. Access may be further restricted based on Doc. A's location, e.g., only allowing access when Doc. A is at the hospital. If, however the request from Doc. A is a solicitation, e.g., for new concierge services, the interaction may be outside the scope of the relationship and blocked or otherwise handled according to default call/message routing rules.

It is also understood that one or more of the communications, the resource subjected to the requested interaction and/or the relationship manager can be controlled or otherwise managed by the same entity, e.g., the network services provider. Alternatively, one or more of the communications, the resource subjected to the requested interaction and/or the relationship manager can be implemented by different entities. When managed by different entities, further agreements and/or arrangements may be required to ensure that rules and/or policies of a behavior associated with a relationship will be implemented.

By way of further illustration, consider the doctor-patient example, in which one entity provides the managed medical records application, while another entity provides communications supporting remote access of the application. The communications entity can monitor communications for request to interaction with the application, forwarding such request to the application service provider for processing according to a behavior of the relationship. The relationship manager can be provided by either of the above entities, or by an entirely different entity offering relationship management services. In the latter scenario, agreements between the relationship service provider to one or more of the other entities can be established to allow for information sharing, access, accounting, and/or billing as may be related to the processing of electronic interactions according to the managed relationships.

Figure 9:
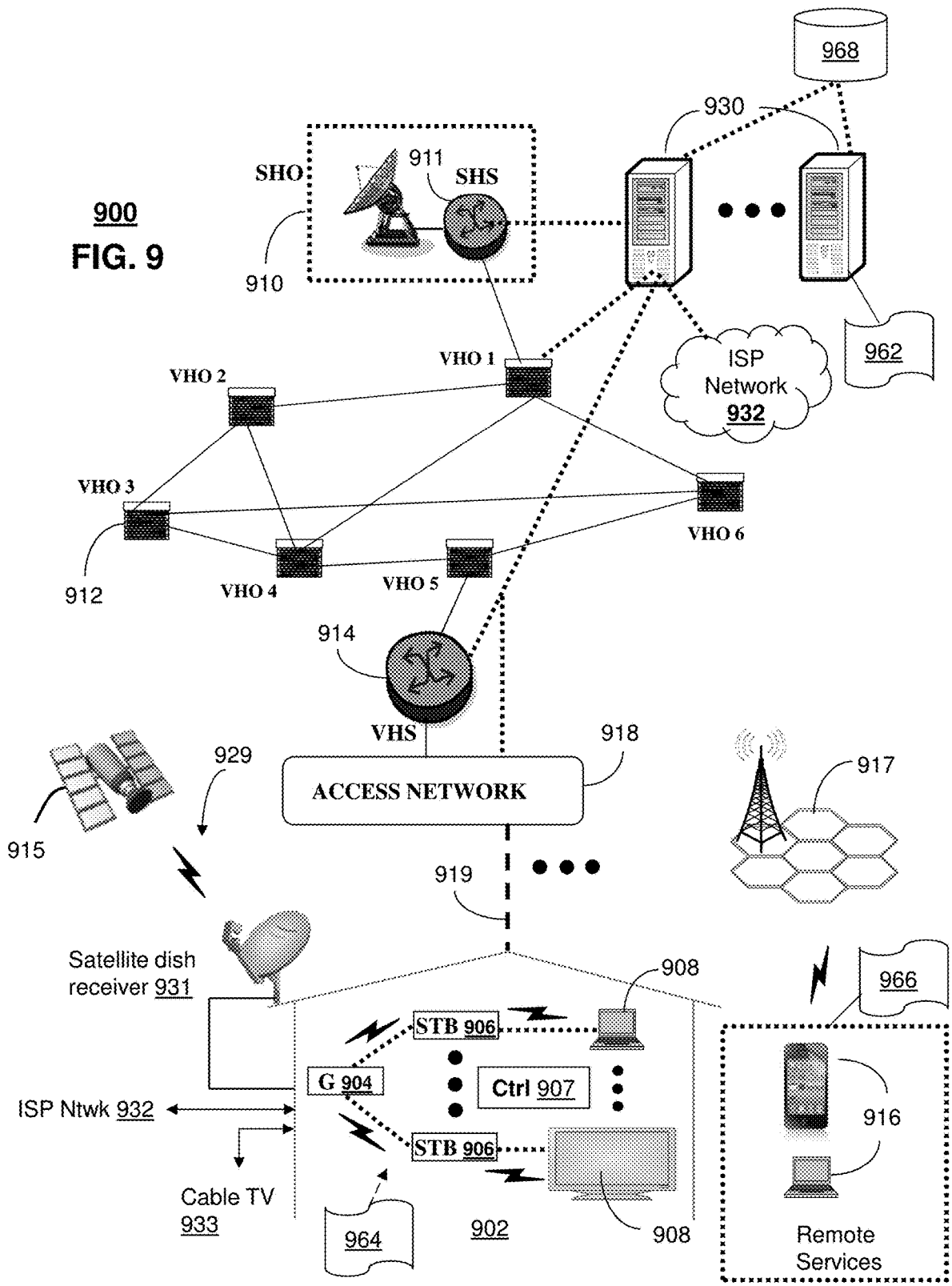
FIG. 9 depicts an illustrative embodiment of a communication system that provides services according to managed relationships as described in FIGS. 1-8.

FIG. 9 depicts an illustrative embodiment of a first communication system 900 for delivering media content. The communication system 900 can represent an Internet Protocol Television (IPTV) media system. Communication system 900 can be overlaid or operably coupled with the systems of FIGS. 1-3 and 5 as another representative embodiment of communication system 900. For instance, one or more devices illustrated in the communication system 900 of FIG. 9 can be configured to determine a request for an electronic interaction associated with a first party and a second party. A relationship between the first party and the second party can be identified, wherein the relationship includes a predetermined rule that affects a behavior of the electronic interaction. An acceptance of the rule by each of the first party and the second party is confirmed and, subject to confirmation, the rule is applied to the electronic interaction to affect the behavior of the electronic interaction.

The IPTV media system can include a super head-end office (SHO) 910 with at least one super headend office server (SHS) 911 which receives media content from satellite and/or terrestrial communication systems. In the present context, media content can represent, for example, audio content, moving image content such as 2D or 3D videos, video games, virtual reality content, still image content, and combinations thereof. The SHS server 911 can forward packets associated with the media content to one or more video head-end servers (VHS) 914 via a network of video head-end offices (VHO) 912 according to a multicast communication protocol.

The VHS 914 can distribute multimedia broadcast content via an access network 918 to commercial and/or residential buildings 902 housing a gateway 904 (such as a residential or commercial gateway). The access network 918 can represent a group of digital subscriber line access multiplexers (DSLAMs) located in a central office or a service area interface that provide broadband services over fiber optical links or copper twisted pairs 919 to buildings 902. The gateway 904 can use communication technology to distribute broadcast signals to media processors 906 such as Set-Top Boxes (STBs) which in turn present broadcast channels to media devices 908 such as computers or television sets managed in some instances by a media controller 907 (such as an infrared or RF remote controller).

The gateway 904, the media processors 906, and media devices 908 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 906 and subsystems of the IPTV media system for services such as video-on-demand (VoD), browsing an electronic programming guide (EPG), or other infrastructure services.

A satellite broadcast television system 929 can be used in the media system of FIG. 9. The satellite broadcast television system can be overlaid, operably coupled with, or replace the IPTV system as another representative embodiment of communication system 900. In this embodiment, signals transmitted by a satellite 915 that include media content can be received by a satellite dish receiver 931 coupled to the building 902. Modulated signals received by the satellite dish receiver 931 can be transferred to the media processors 906 for demodulating, decoding, encoding, and/or distributing broadcast channels to the media devices 908. The media processors 906 can be equipped with a broadband port to an Internet Service Provider (ISP) network 932 to enable interactive services such as VoD and EPG as described above.

In yet another embodiment, an analog or digital cable broadcast distribution system such as cable TV system 933 can be overlaid, operably coupled with, or replace the IPTV system and/or the satellite TV system as another representative embodiment of communication system 900. In this embodiment, the cable TV system 933 can also provide Internet, telephony, and interactive media services. System 900 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 930, a portion of which can operate as a web server for providing web portal services over the ISP network 932 to wireline media devices 908 or wireless communication devices 916.

Communication system 900 can also provide for all or a portion of the computing devices 930 to function as a relationship server or relationship manager (herein referred to as relationship manager 930). The relationship manager 930 can use computing and communication technology to perform function 962, which can include among other things, the relationship management techniques described by processes 600 of FIG. 6A, process 650 of FIG. 6B and process 700 of FIG. 7. For instance, function 962 of server 930 can be similar to the functions described for the modules 104, 204, 312, 508 or sub-modules of FIGS. 1-3 and 5, in accordance with the processes 600, 650, 700, 800 of FIGS. 6A, 6B and 7-8. The media processors 906 and wireless communication devices 916 can be provisioned with software functions 964 and 966, respectively, to utilize the services of relationship manager 930. For instance, functions 964 and 966 of media processors 906 and wireless communication devices 916 can be similar to the functions described for the modules 104, 204, 312, 508 or sub-modules of FIGS. 1-3 and 5, in accordance with the processes 600, 650, 700, 800 of FIGS. 6A, 6B and 7-8.

Multiple forms of media services can be offered to media devices over landline technologies such as those described above. Additionally, media services can be offered to media devices by way of a wireless access base station 917 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 10:
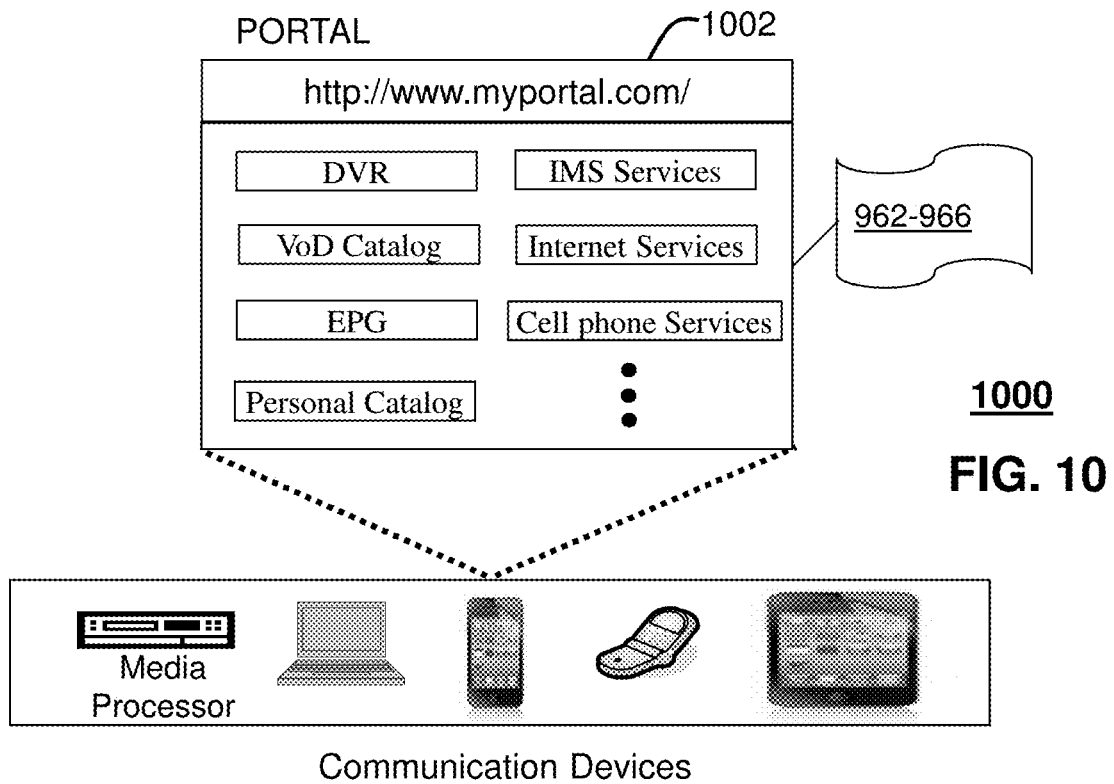
FIG. 10 depicts an illustrative embodiment of a web portal for interacting with the relationship management systems of FIGS. 1-3 and 5, and the communication system of FIG. 9.

FIG. 10 depicts an illustrative embodiment of a web portal 1002 of a communication system 1000. Communication system 1000 can be overlaid or operably coupled with the relationship management systems 100, 200, 300 and 500 of FIGS. 1-3 and/or 5, communication system 900, and/or communication system 900 as another representative embodiment of relationship management systems 100, 200, 300 and 500 of FIGS. 1-3 and/or 5, communication system 900, and/or communication system 900. The web portal 1002 can be used for managing services of relationship management systems 100, 200, 300 and 500 of FIGS. 1-3 and/or 5 and communication systems 900. A web page of the web portal 1002 can be accessed by a Uniform Resource Locator (URL) with an Internet browser using an Internet-capable communication device such as those described FIGS. 1-3 and 5. The web portal 1002 can be configured, for example, to access a media processor 906 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 906. The web portal 1002 can also be used for provisioning IMS services described earlier, provisioning Internet services, provisioning cellular phone services, and so on.

The web portal 1002 can further be utilized to manage and provision relationship management software applications 962-966 to adapt these applications as may be desired by subscribers and/or service providers of relationship management systems 100, 200, 300 and 500 of FIGS. 1-3 and/or 5, and communication system 900. For instance, users of the services provided by any of the modules 104, 204, 312, 508 or sub-modules and/or the server 930 can log into their on-line accounts and provision the servers modules 104, 204, 312, 508 or sub-modules or server 930 to create, modify or otherwise manage user profiles, subscriber accounts, managed relationships, and access to resources and/or services to enable it to communication with devices described in FIGS. 1-3, 5 and 9, and so on. Service providers can log onto an administrator account to provision, monitor and/or maintain the relationship management systems 100, 200, 300 and 500 of FIGS. 1-3 and/or 5, or server 930.

Figure 11:
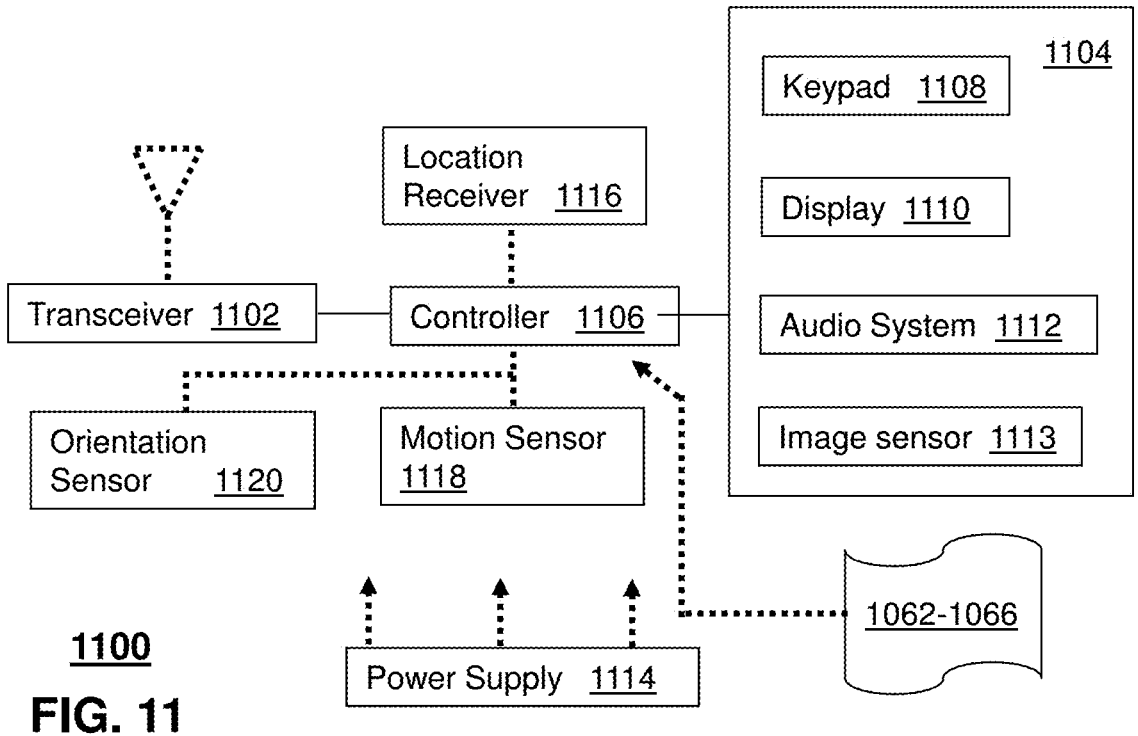
FIG. 11 depicts an illustrative embodiment of a communication device.

FIG. 11 depicts an illustrative embodiment of a communication device 1100. Communication device 1100 can serve in whole or in part as an illustrative embodiment of the devices depicted in FIGS. 1-3 and/or 5, and FIG. 9 and can be configured to perform portions of the relationship management processes of 600, 650 700, 800 of FIGS. 6A, 6B and 7-8.

Communication device 1100 can comprise a wireline and/or wireless transceiver 1102 (herein transceiver 1102), a user interface (UI) 1104, a power supply 1114, a location receiver 1116, a motion sensor 1118, an orientation sensor 1120, and a controller 1106 for managing operations thereof. The transceiver 1102 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1102 can also be adapted to support circuit-switched wireline access technologies (such as PSTN), packet-switched wireline access technologies (such as TCP/IP, VoIP, etc.), and combinations thereof.

The UI 1104 can include a depressible or touch-sensitive keypad 1108 with a navigation mechanism such as a roller ball, a joystick, a mouse, or a navigation disk for manipulating operations of the communication device 1100. The keypad 1108 can be an integral part of a housing assembly of the communication device 1100 or an independent device operably coupled thereto by a tethered wireline interface (such as a USB cable) or a wireless interface supporting for example Bluetooth®. The keypad 1108 can represent a numeric keypad commonly used by phones, and/or a QWERTY keypad with alphanumeric keys. The UI 1104 can further include a display 1110 such as monochrome or color LCD (Liquid Crystal Display), OLED (Organic Light Emitting Diode) or other suitable display technology for conveying images to an end user of the communication device

1100. In an embodiment where the display 1110 is touch-sensitive, a portion or all of the keypad 1108 can be presented by way of the display 1110 with navigation features.

The display 1110 can use touch screen technology to also serve as a user interface for detecting user input. As a touch screen display, the communication device 1100 can be adapted to present a user interface with graphical user interface (GUI) elements that can be selected by a user with a touch of a finger. The touch screen display 1110 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1110 can be an integral part of the housing assembly of the communication device 1100 or an independent device communicatively coupled thereto by a tethered wireline interface (such as a cable) or a wireless interface.

The UI 1104 can also include an audio system 1112 that utilizes audio technology for conveying low volume audio (such as audio heard in proximity of a human ear) and high volume audio (such as speakerphone for hands free operation). The audio system 1112 can further include a microphone for receiving audible signals of an end user. The audio system 1112 can also be used for voice recognition applications. The UI 1104 can further include an image sensor 1113 such as a charged coupled device (CCD) camera for capturing still or moving images.

The power supply 1114 can utilize common power management technologies such as replaceable and rechargeable batteries, supply regulation technologies, and/or charging system technologies for supplying energy to the components of the communication device 1100 to facilitate long-range or short-range portable applications. Alternatively, or in combination, the charging system can utilize external power sources such as DC power supplied over a physical interface such as a USB port or other suitable tethering technologies.

The location receiver 1116 can utilize location technology such as a global positioning system (GPS) receiver capable of assisted GPS for identifying a location of the communication device 1100 based on signals generated by a constellation of GPS satellites, which can be used for facilitating location services such as navigation. The motion sensor 1118 can utilize motion sensing technology such as an accelerometer, a gyroscope, or other suitable motion sensing technology to detect motion of the communication device 1100 in three-dimensional space. The orientation sensor 1120 can utilize orientation sensing technology such as a magnetometer to detect the orientation of the communication device 1100 (north, south, west, and east, as well as combined orientations in degrees, minutes, or other suitable orientation metrics).

The communication device 1100 can use the transceiver 1102 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1106 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1100.

Other components not shown in FIG. 11 can be used in one or more embodiments of the subject disclosure. For instance, the communication device 1100 can include a reset button (not shown). The reset button can be used to reset the controller 1106 of the communication device 1100. In yet another embodiment, the communication device 1100 can also include a factory default setting button positioned, for example, below a small hole in a housing assembly of the communication device 1100 to force the communication device 1100 to re-establish factory settings. In this embodiment, a user can use a protruding object such as a pen or paper clip tip to reach into the hole and depress the default setting button. The communication device 1100 can also include a slot for adding or removing an identity module such as a Subscriber Identity Module (SIM) card. SIM cards can be used for identifying subscriber services, executing programs, storing subscriber data, and so forth.

The communication device 1100 as described herein can operate with more or less of the circuit components shown in FIG. 11. These variant embodiments can be used in one or more embodiments of the subject disclosure.

The communication device 1100 can be adapted to perform the functions of the equipment of the entities 102, the relationship manager 104, and or equipment supporting one or more of the storage, application, processing and/or network services 110 of FIG. 1. Likewise, the communication device 1100 can be adapted to perform one or more of the functions of the equipment of the equipment, e.g., 202, 204, 206, 210 of FIG. 2, the equipment, e.g., 302, 304, 306, 312, 316 of FIG. 3, and equipment supporting the system 500 of FIG. 5. Devices of FIGS. 1-3 and/or 5, the media processor 906, the media devices 908, or the portable communication devices 916 of FIG. 9. It will be appreciated that the communication device 1100 can also represent other devices that can operate in FIGS. 1-3 and/or 5, communication system 900 of FIG. 4 such as a gaming console and a media player. In addition, the controller 1106 can be adapted in various embodiments to perform the relationship management functions 962-966.

The environments disclosed herein allow each party to create multiple behavior capabilities that render specific, subscribed client behaviors. Such capabilities can be managed by leveraging common tool sets, e.g., available from a service provider. Thus, one party can have subscribed behaviors unique to itself every other potential client connection. Alternatively or in addition, the party can have "aggregated" behaviors for specific groups of clients. Where there is some adaptation to a relationship between different parties, the relationship can be defined separately for any specific request for interactions associated with the parties. This invention allows the relationship to be defined separately from any request. The relationship can remain in effect regardless of the request.

Upon reviewing the aforementioned embodiments, it would be evident to an artisan with ordinary skill in the art that said embodiments can be modified, reduced, or enhanced without departing from the scope of the claims described below. For example, rules/behaviors and/or control can be aggregated among entities or personas (e.g., applied to multiple members of a business group entity, a family entity, a social group, an affinity group). Consider a baseline rule that is published or otherwise delivered to members of a group. In some embodiments, the individual group members may simply accept or reject the baseline rule. In other instances, the individual group members may undertake a tailoring and or personalizing of baseline rule. Such modifications can be performed by selectable or otherwise choosing among a number of predefined variable parameters.

In some embodiments, personas and/or relationships can be included in a configuration file, such as a user and/or system profile or description. It is conceivable that one or more of personas, relationship types, or roles, rules and policies as they relate to behavior of interactions can be captured in software, e.g., software libraries, firmware, or even hardware, e.g., SIM cards, for reuse, sale or lease.

The techniques disclosed herein can supports an entity with managed access to data, network, and/or computing resources across one or multiple devices individually or simultaneously. That is, a user under the same managed relationship may engage in interactions on a first device, such as a media player presenting interactive media content, while engaging in interactions on a second device, such as a computer and/or smart phone. The phone can be used for a side channel, e.g., in a computer gaming scenario in which members of a team engage in gameplay with other teams as presented through the media player and/or game console.

Management of interactions based on pre-defined relationships can support various billing and accounting scenarios. For example, charges for services can be established based on a particular relationship. As the relationship may evolve over time, and/or based on occurrences of certain events, so to may billing and/or accounting. Such evolution of the relationship can be accounted for during a definition and mutual assent of the relationship. Accordingly, the behavior imposed by the predefined relationship may vary depending upon a state of the relationship as determined by an occurrence or non-occurrence of a particular event, or so forth. In some embodiments, the mutually agreed to relationship can terminate based on an occurrence or non-occurrence of a particular event, or so forth.

It is also understood that in at least some instances, ratification and/or termination of a predefined relationship can be accomplished unilaterally. That is, one or both parties may have a right to cancel a relationship at any time, without requiring assent of the other party. Likewise, assent to the original pre-defined relationship may allow one or both of the parties to unilaterally ratify the relationship by altering, adding and/or removing certain predefined roles, rules and/or policies.

It is also understood that the techniques disclosed herein can support a focused use-based billing, e.g., charges can be tied to entity and not to underlying device. By way of example, a student, Claire, places a call, and/or accesses data using a fellow student's, Dan's, device smartphone or tablet device. Claire authenticates herself and/or one of here personas, e.g., as illustrated in FIG. 2, to participate in an interaction subject to one of her predefined relationships. A communication service provider recognizing Clair's relationship provides services as required by the interaction. The service provider can account for data usage, calls, etc., under Claire's account, without accruing any overlapping charges to Dan's account, even though the services were delivered using Dan's device.

In general, an identifier function can be launched, e.g., providing end-to-end behavior, based on authentication and/or authorization, user role and attributes, device characteristics, subscribed behavior and so forth as covered by the predetermined relationship. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 12:
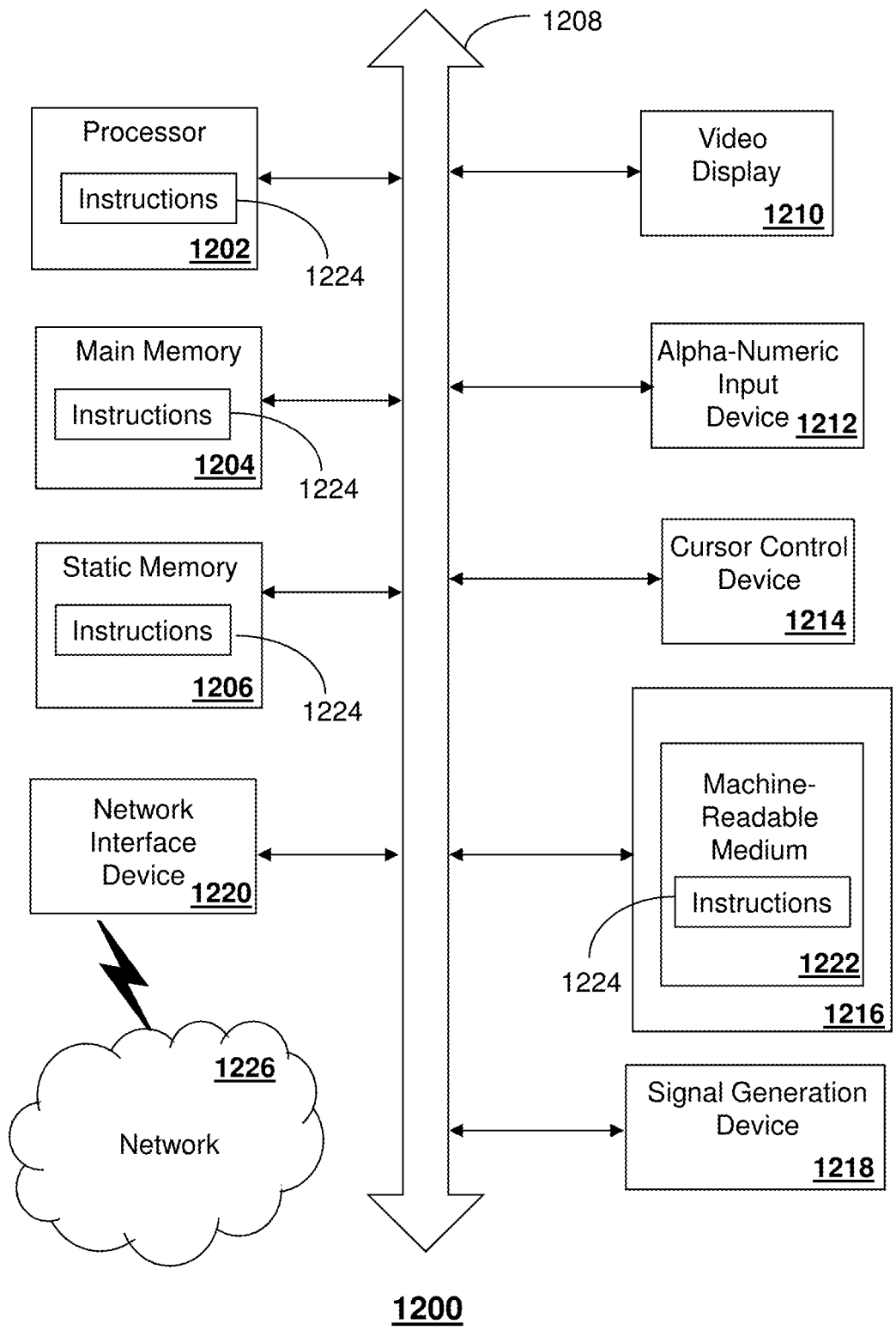
FIG. 12 is a diagrammatic representation of a machine in the form of a computer system within which a set of instructions, when executed, may cause the machine to perform any one or more of the methods described herein.

FIG. 12 depicts an exemplary diagrammatic representation of a machine in the form of a computer system 1200 within which a set of instructions, when executed, may cause the machine to perform any one or more of the methods described above. One or more instances of the machine 1200 can operate as any of the modules, engines and servers disclosed herein. For example, the machine 1200 can operate as the relationship manager 104, 204 of FIGS. 1-2, the service information module 312 and/or the product information module 306 of FIG. 3, or the customer experience rules module 508 of FIG. 5, or the server 930, the media processor 906. In some embodiments, the machine may be connected (e.g., using a network 1226) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1200 may include a processor (or controller) 1202 (e.g., a central processing unit (CPU)), a graphics processing unit (GPU, or both), a main memory 1204 and a static memory 1206, which communicate with each other via a bus 1208. The computer system 1200 may further include a display unit 1210 (e.g., a liquid crystal display (LCD), a flat panel, or a solid state display). The computer system 1200 may include an input device 1212 (e.g., a keyboard), a cursor control device 1214 (e.g., a mouse), a disk drive unit 1216, a signal generation device 1218 (e.g., a speaker or remote control) and a network interface device 1220. In distributed environments, the embodiments described in the subject disclosure can be adapted to utilize multiple display units 1210 controlled by two or more computer systems 1200. In this configuration, presentations described by the subject disclosure may in part be shown in a first of the display units 1210, while the remaining portion is presented in a second of the display units 1210.

The disk drive unit 1216 may include a tangible computer-readable storage medium 1222 on which is stored one or more sets of instructions (e.g., software 1224) embodying any one or more of the methods or functions described herein, including those methods illustrated above. The instructions 1224 may also reside, completely or at least partially, within the main memory 1204, the static memory 1206, and/or within the processor 1202 during execution thereof by the computer system 1200. The main memory 1204 and the processor 1202 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1222 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1200.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   authenticating, by a processing system comprising a processor, equipment of a first party and equipment of a second party, wherein the authenticating comprises a dynamic authorization based on a time and location of the equipment of the first party and equipment of the second party;
   providing to the equipment of the first party and equipment of the second party, by the processing system comprising a processor, party information including a first root identity for the first party and a second root identity for the second party, and wherein first additional personas of a first plurality of personas for the first party are linked to the first root identity and second additional personas of a second plurality of personas for the second party are linked to the second root identity;
   determining, by the processing system, a first determined persona from the first plurality of personas for the first party and a second determined persona from the second plurality of personas for the second party based on a present interaction between the equipment of the first party and the equipment of the second party;
   generating, by the processing system, a first rule according to the first determined persona and the second determined persona, wherein the first rule defines an interaction between the first party and the second party via an information resource;
   configuring, by the processing system, the information resource based on the first rule resulting in configured service management infrastructure that supports access to the information resource via network devices and the equipment of the first party in accordance with the first rule and according to a determination that the equipment of the first party is authenticated according to the dynamic authorization; and
   providing, by the processing system, access to the information resource via the configured service management infrastructure for the present interaction.

2. The method of claim 1, wherein the first rule comprises one of instructions to configure the network devices, executable code that configures the network devices or both,
   wherein the method further comprises, receiving, by the system, messages indicating an acceptance of the first rule by the equipment of the first party and the equipment of the second party, and
   wherein the configuring of the network devices is in response to the receiving of the messages indicating the acceptance of the first rule.

3. The method of claim 1, further comprising:
   determining information concerning selection of selectable characteristics pertaining to a relationship between the first party and the second party, wherein the selectable characteristics comprise fixed attributes and dynamic attributes, wherein the fixed attributes include fixed party information, and wherein the dynamic attributes include dynamic party information; and
   modifying the first rule based on the dynamic attributes.

4. The method of claim 1, wherein the authorizing further comprises:
   receiving, by the processing system, a credential from the equipment of the first party or a credentialing authority; and
   authorizing, by the processing system, access to the information resource based on the credential by the equipment of the first party, wherein the configuring of the information resource is in response to the authorizing of the access.

5. The method of claim 1, wherein the first rule modifies settings of the configured service management infrastructure to effectuate the first rule, wherein the network devices provide a network-accessible service, and wherein the settings modified by the first rule restrict data accessibility of the information resource by the network devices, and wherein the equipment of the second party includes the information resource.

6. The method of claim 1, wherein the dynamic authorization further comprises a multifactor identification of one or both of the equipment of the first party and the equipment of the second party.

7. The method of claim 1, wherein the dynamic authorization further comprises determining a contextual risk from the equipment one of the first party and the equipment of the second party.

8. The method of claim 3, wherein the dynamic attributes comprise a location, a business group ID, a personal group ID, hardware type and/or hardware ID, date, time, other environmental attributes, or a combination thereof.

9. The method of claim 3, wherein selection of selectable characteristics comprise a behavior, a trait, an expectation, a norm, or a combination thereof of the relationship between the first party and the second party, the method further comprising:

storing, by the processing system, the first rule in association with the relationship between the first party and the second party;

receiving, by the processing system, a request to access the configured service management infrastructure; verifying, by the processing system, the first party, the second party, or both parties from the request to access the configured service management infrastructure based on the authorizing;

identifying, by the processing system, the relationship based on the identifying of the first party, the second party, or both parties; and retrieving, by the processing system, the first rule in response to the identifying of the relationship.

10. The method of claim 3, further comprising:

receiving, by the processing system, an update of the first rule;

generating, by the processing system, a second rule based on the update;

associating, by the processing system, the second rule with the relationship between the first party and the second party, wherein the second rule modifies settings of the configured service management infrastructure to effectuate the second rule;

receiving, by the processing system, a second request to access the information resource;

determining, by the processing system, that the second request is associated with the relationship;

retrieving, by the processing system, the second rule in response to the determining that the request is associated with the relationship;

reconfiguring, by the processing system, the configured service management infrastructure based on the second rule resulting in reconfigured service management infrastructure that supports access to the information resource by the network devices in accordance with the second rule; and providing, by the processing system, access to the information resource via the reconfigured service management infrastructure.

11. The method of claim 10, wherein the providing of the access to the reconfigured service management infrastructure in accordance with the first rule is responsive to the request received from communication equipment of the first party and according to a continued authorization of the equipment of the first party based on a determination of the dynamic authorization, wherein the providing of the access to the reconfigured service management infrastructure in accordance with the second rule is responsive to the second request received from communication equipment of the second party and according to a continued authorization of the equipment of the second party based on the dynamic authorization, and wherein the first rule differs from the second rule.

12. A device, comprising:

a processing system including a processor; and a memory that stores executable instructions that, when executed by the processing system, facilitate performance of operations, comprising:

providing to equipment of a first party and equipment of a second party information including a first root identity for the first party and a second root identity for the second party, and wherein first additional personas of a first plurality of personas for the first party are linked to the first root identity and second additional personas of a second plurality of personas for the second party are linked to the second root identity;

determining information concerning selection of selectable characteristics pertaining to a social relationship between the first party and the second party, wherein the selectable characteristics comprise fixed attributes and dynamic attributes, wherein the fixed attributes include fixed party information, and wherein the dynamic attributes include dynamic party information;

determining a first determined persona from the first plurality of personas for the first party and a second determined persona from the second plurality of personas for the second party based on a present interaction between the first party and the second party;

generating a first rule according to the first determined persona and the second determined persona, wherein the first rule defines an interaction between the first party and the second party via an information resource;

configuring the information resource based on the first rule resulting in configured service management infrastructure that supports access to the information resource via network devices and user equipment in accordance with the first rule;

authenticating the equipment of the first party via a dynamic authorization based on a time and location of the equipment of the first party; and providing access to the information resource via the configured service management infrastructure for the present interaction responsive to a determination that the equipment of the first party is authenticated.

13. The device of claim 12, wherein the operations further comprise:

receiving a request to access the information resource;

identifying the first party, the second party, or both parties from the request to access the information resource;

identifying the social relationship based on the identifying of the first party, the second party, or both parties; and responsive to identifying the social relationship, retrieving the first rule associated with the social relationship.

14. The device of claim 12, wherein the operations further comprise receiving an indication of an acceptance of the first rule by the equipment of the first party and the equipment of the second party, wherein the configuring of the information resource is in response to the receiving of the indication of the acceptance of the first rule.

15. The device of claim 12, wherein the dynamic authorization is based on a contextual risk assessment and a multifactor identification of the first party, and wherein the operations further comprise dynamically authenticating the equipment of the second party.

16. The device of claim 13, wherein, when the request is received from communication equipment of the first party, wherein the operations further comprises receiving a second preference;

generating a second rule based on the second preference;

associating the second rule with the social relationship between the first party and the second party, wherein the second rule modifies operations of the configured service management infrastructure;

receiving a second request from communication equipment of the second party to access the information resource;

determining that the second request to access the information resource from the communication equipment of the second party is associated with the social relationship;

retrieving the second rule in response to the determining that the second request is associated with the social relationship;

reconfiguring the configured service management infrastructure based on the second rule resulting in reconfigured service management infrastructure that supports access to the information resource in accordance with the second rule; and providing access to the information resource via the reconfigured service management infrastructure.

17. A non-transitory machine-readable storage medium, comprising executable instructions that, when executed by a processing system including a processor, facilitate performance of operations, comprising:

receiving from equipment of a first entity, from equipment of a second entity, or from both, a first input defining party information including a first root identity for the first entity and a second root identity for the second entity, and wherein first additional personas of a first plurality of personas for the first entity are linked to the first root identity and second additional personas of a second plurality of personas for the second entity are linked to the second root identity;

determining a first determined persona from the first plurality of personas for the first entity and a second determined persona from the second plurality of personas for the second entity based on a present interaction between the first entity and the second entity;

generating a first rule according to the first determined persona and the second determined persona, wherein the first rule defines an interaction between the first entity and the second entity via an information resource;

configuring the information resource based on the first rule resulting in configured service management infrastructure that supports access to the information resource via network devices and user equipment in accordance with the first rule;

receiving an authentication of the equipment of the first entity and the equipment of the second entity via a first dynamic authorization of the equipment of the first entity based on a first time based, intermittent multifactor authentication and a second dynamic authorization of the second entity based on a second time based, intermittent multifactor authentication; and providing access to the information resource via the configured service management infrastructure for the present interaction responsive to a determination that the equipment of the first entity and the equipment of the second entity are each authenticated.

18. The non-transitory machine-readable storage medium of claim 17, wherein the operations further comprise:

receiving a request to access the information resource;

identifying the first entity, the second entity, or both parties from the request to access the information resource;

identifying a relationship based on the identifying of the first entity, the second entity, or both entities; and determining the first rule in response to a determining that the request is associated with the relationship.

19. The non-transitory machine-readable storage medium of claim 17, wherein the information resource provides access to stored information of the first entity, wherein the first rule defines an extent of the access to the stored information by equipment of the second entity, and wherein the extent of the access to the stored information is based on the first rule.

20. The non-transitory machine-readable storage medium of claim 18, wherein the relationship comprises a plurality of states, wherein the first rule depends upon a state of the plurality of states, wherein the determining the first determined persona and the second determined persona further comprises determining information concerning selection of selectable characteristics pertaining to the interaction between the first entity and the second entity, and wherein the selectable characteristics comprise fixed attributes and dynamic attributes, and wherein the fixed attributes include fixed entity information, and wherein the dynamic attributes include dynamic entity information.

* * * * *